(12) United States Patent
Kimura et al.

(10) Patent No.: US 7,391,454 B2
(45) Date of Patent: Jun. 24, 2008

(54) IMAGE SENSOR CONTROLLER, ELECTRONIC DEVICE, AND METHOD FOR CONTROLLING IMAGE SENSOR

(75) Inventors: Kenji Kimura, Sapporo (JP); Eiji Satake, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 868 days.

(21) Appl. No.: 10/715,741

(22) Filed: Nov. 18, 2003

(65) Prior Publication Data

US 2004/0160652 A1 Aug. 19, 2004

(30) Foreign Application Priority Data

Nov. 19, 2002 (JP) .............................. 2002-335175

(51) Int. Cl.
*H04N 3/14* (2006.01)
(52) U.S. Cl. ...................................... 348/312; 348/245
(58) Field of Classification Search ................ 348/245, 348/312
See application file for complete search history.

(56) References Cited

U.S. PATENT DOCUMENTS

| | | | | |
|---|---|---|---|---|
| 4,910,599 | A | * | 3/1990 | Hashimoto ................ 348/240.2 |
| 5,191,426 | A | * | 3/1993 | Kochi ......................... 348/300 |
| 5,539,532 | A | | 7/1996 | Watanabe |
| 5,684,609 | A | * | 11/1997 | Potucek et al. .............. 358/482 |
| 6,100,928 | A | * | 8/2000 | Hata ........................ 348/229.1 |
| 6,528,962 | B1 | | 3/2003 | Igarashi et al. |
| 6,748,124 | B1 | | 6/2004 | Nishiyama |

FOREIGN PATENT DOCUMENTS

| | | |
|---|---|---|
| CN | 1282015 | 1/2001 |
| CN | 1320248 | 10/2001 |
| JP | 61111063 | 5/1986 |
| JP | 61227692 | 10/1986 |
| JP | 01258557 | 10/1989 |
| JP | 02308234 | 12/1990 |
| JP | 3177156 | 8/1991 |
| JP | 04092557 | 3/1992 |
| JP | 04270551 | 9/1992 |
| JP | 04306057 | 10/1992 |
| JP | 10107962 | 4/1998 |
| JP | 11164101 | 6/1999 |
| JP | 2000050031 | 2/2000 |
| JP | 2001103778 | 4/2001 |
| JP | 2001158143 | 6/2001 |
| JP | 2002-199160 | 7/2002 |

* cited by examiner

*Primary Examiner*—Tuan Ho
*Assistant Examiner*—Anthony J Daniels

(57) ABSTRACT

An image sensor controller and methods achieve faster image reading speeds by controlling the frequency of image sensor transfer clocks $\phi 1$, $\phi 2$ in accordance with the particular output period. Such an image sensor controller includes a drive controller that supplies to a transfer section of the image sensor transfer clocks $\phi 1$, $\phi 2$ whose clock frequency during dummy pixel output periods is faster than it is during an effective pixel output period, or whose clock frequency during non-reading pixel output periods is faster than it is during a reading pixel output period. A pattern selector selects among clock patterns in a table for setting $\phi 1$, $\phi 2$ according to the output periods of the image sensor. Even when the clock frequency of $\phi 1$, $\phi 2$ changes, a transfer clock ADCK signal can be supplied at a constant clock frequency to an A/D converter.

16 Claims, 16 Drawing Sheets

Fig. 8 (A)
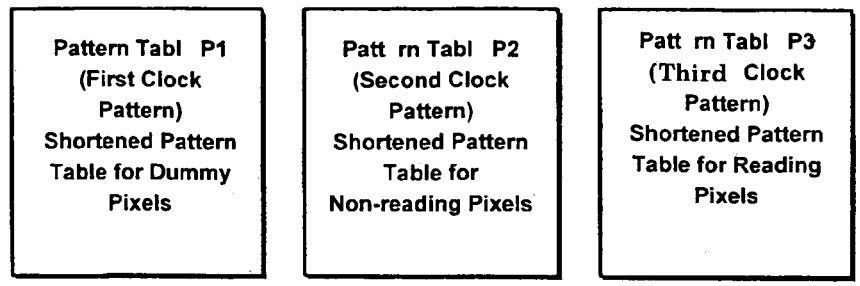
Fig. 8 (B)
Pattern Table
| ADR | φ1 | φ2 | ---- |
|-----|----|----|------|
| 00  | 0  | 0  |      |
| 01  | 1  | 0  |      |
| 02  | 1  | 0  | ---- |
| 03  | 1  | 0  |      |
| 04  | 0  | 0  |      |
| 05  | 0  | 1  | ---- |
| 06  | 0  | 1  |      |
| 07  | 0  | 1  |      |
| 08  | 0  | 0  | ---- |
| 09  | 0  | 0  |      |
Fig. 8 (C)
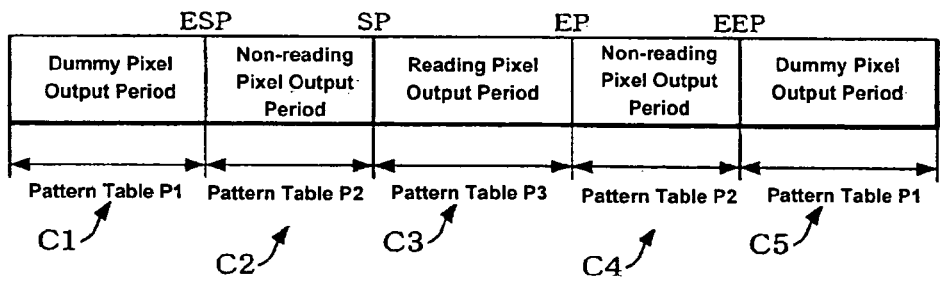
Fig. 8 (D)
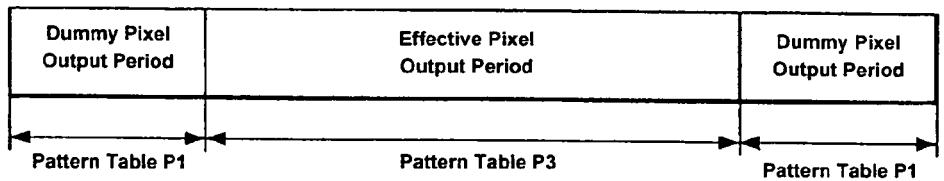

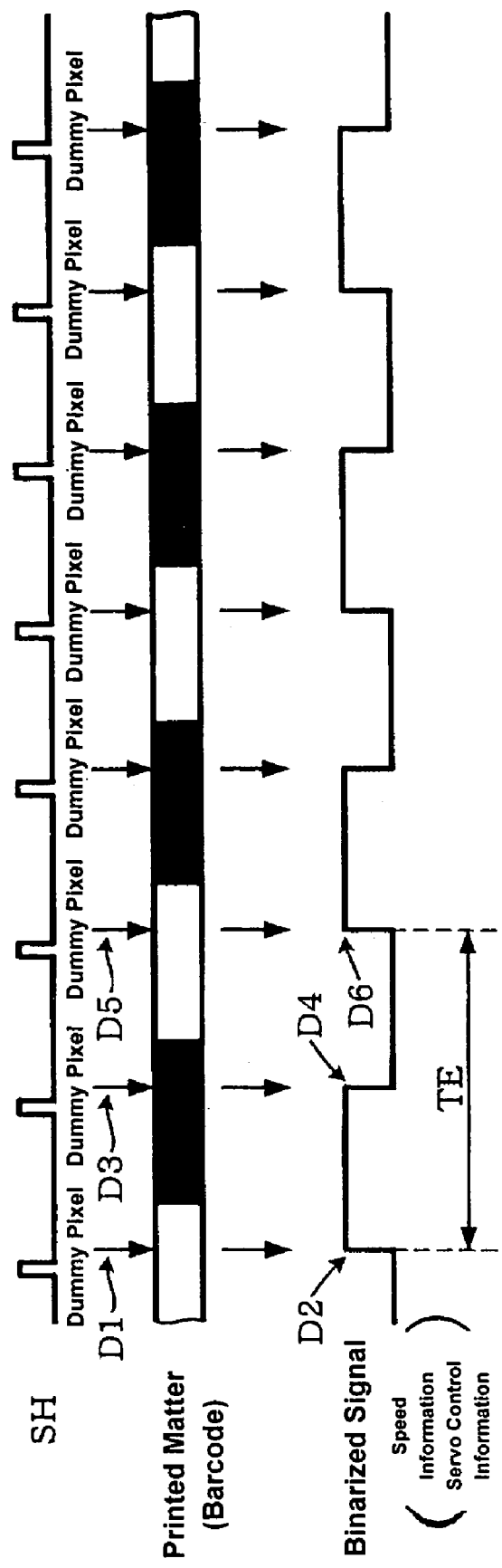

IMAGE SENSOR CONTROLLER, ELECTRONIC DEVICE, AND METHOD FOR CONTROLLING IMAGE SENSOR

RELATED APPLICATION DATA

This application is related to two applications filed concurrently herewith: (1) entitled "Electronic Device"; and (2) entitled "Electronic Device Controller, and Method for Controlling Electronic Device". Both of these related applications are incorporated by reference herein.

BACKGROUND OF THE INVENTION

1. Field of the Invention

The present invention relates to image sensor controllers, electronic devices, and methods for controlling image sensors to obtain faster image reading speeds.

2. Description of the Related Art

An image reading device such as an image scanner, facsimile machine or copy machine uses an image sensor, i.e., Charge Coupled Device (CCD), Contact Image Sensor (CIS), or Bucket Brigade Device (BBD), to read images. A particular type of CCD (a CCD line image sensor) is usually employed in an image scanner to read images.

With a line type image sensor, image information is gathered by a light receiving section of the image sensor and supplied in the form of an image data signal to a transfer section of the image sensor. An image sensor controller supplies a transfer clock to the transfer section, and the transfer section uses that transfer clock to successively shift and transfer the image data externally. Then, the outputted analog image data is converted to digital image data, and image processing such as gamma conversion is performed.

However, conventional image sensor controllers use only a fixed transfer clock pattern to drive an image sensor. For this reason, image data for dummy pixel regions, which are essentially unnecessary image data, are transferred at the same transfer rate as image data for effective pixel regions. As a result, the time for shift and transfer operations at the transfer section is unnecessarily long.

OBJECTS OF THE INVENTION

The present invention has been made in view of the technical problem described above. Accordingly, an object of this invention is to provide image sensor controllers, electronic devices and methods for controlling image sensors, which can shorten the time for shift and transfer operations, and thereby achieve a faster image reading speed.

Another object of the present invention is to provide image sensor controllers, electronic devices and methods for controlling image sensors, which can increase the degree of freedom in setting clock patterns to be supplied to an image sensor.

SUMMARY OF THE INVENTION

The present invention relates to an image sensor controller that controls an image sensor having a light receiving section and a transfer section that receives image data from the light receiving section. The image sensor controller comprises a drive controller that supplies to the transfer section, which shifts and transfers received image data, a shift/transfer clock for shifting and transferring the image data.

In accordance with one embodiment, the shift/transfer clock supplied by the drive controller to the transfer section has a clock frequency that is higher in a dummy pixel output period during which image data obtained from a dummy pixel region of the light receiving section is outputted from the transfer section than in an effective pixel output period during which image data for an effective pixel region of the light receiving section is outputted from the transfer section.

As a result of increasing the frequency of the shift/transfer clock during the dummy pixel output period, the shift/transfer time at the transfer section can be shortened and a faster image reading speed can be achieved. In addition to changing the frequency of the shift/transfer clock during the dummy pixel output period, the rise timing, fall timing or clock duty of the clock pulse may also be changed.

In accordance with another embodiment, the shift/transfer clock supplied by the drive controller to the transfer section has a clock frequency that is higher in a non-reading pixel output period during which image data obtained from a non-reading pixel region of the light receiving section is outputted from the transfer section than in a reading pixel output period during which image data for a reading pixel region of the light receiving section is outputted from the transfer section.

As a result of increasing the frequency of the shift/transfer clock during the non-reading pixel output period, the shift/transfer time at the transfer section can be shortened and a faster image reading speed can be achieved. In addition to changing the frequency of the shift/transfer clock during the non-reading pixel output period, the rise timing, fall timing or clock duty of the clock pulse may also be changed.

In accordance with a further embodiment, the shift/transfer clock supplied by the drive controller to the transfer section has a clock frequency that is highest in a dummy pixel output period during which image data obtained from the dummy pixel region is outputted from the transfer section, next highest in a non-reading pixel output period during which image data obtained from the non-reading pixel region is outputted from the transfer section, and lowest in a reading pixel output period during which image data obtained from the reading pixel region is outputted from the transfer section.

By so changing the shift/transfer clock frequency in stages, the image reading speed can be optimized.

In accordance with any of these embodiments, the drive controller may include a pattern selector that selects, from among a plurality of clock patterns for setting shift/transfer clocks, a specific clock pattern for each period during which image data is outputted from the transfer section of the image sensor.

In such cases, the pattern selector may select the clock patterns in cycles, for example, to generate the shift/transfer clock. For example, a first clock pattern may be selected in the dummy pixel output period and a third clock pattern in the effective pixel output period. Or, a plurality of clock patterns having different patterns may be successively selected in the dummy pixel output period, and a plurality of clock patterns having different patterns may be successively selected during the effective pixel output period. In the embodiment having reading and non-reading pixel output periods, the pattern selector may select a second clock pattern in the non-reading pixel output period and a third clock pattern in the reading pixel output period. Alternatively, a plurality of clock patterns having different patterns may be successively selected in the non-reading pixel output period.

In accordance with embodiments of the present invention, the drive controller may include a memory that stores the plurality of clock patterns to be selected by the pattern selector. Moreover, the pattern selector may select from among those stored clock patterns a specific clock pattern for each image data output period based on pattern switch timing setting information and may supply the shift/transfer clock to the transfer section of the image sensor based on the clock pattern selected. For example, upon making a determination based on pattern switch timing setting information as to the particular output period, the corresponding clock pattern is selected and shift/transfer clock is supplied accordingly.

Also, in accordance with embodiments of the present invention, the image sensor controller may include an image processing controller that (i) supplies an A/D conversion/transfer clock to an A/D converter that converts analog image data sent from the transfer section of the image sensor to digital image data and (ii) receives the digital image data outputted from the A/D converter based on the A/D conversion/transfer clock.

The image processing controller may invalidate image data obtained from the dummy pixel region and the non-reading pixel region received from the A/D converter. To invalidate image data may mean to ignore or not to receive image data from the A/D converter, or not to render image processing, or not to output to a circuit in a succeeding stage.

In accordance with other embodiments, the image processing controller may disable an output operation of the A/D converter during periods in which the A/D converter outputs image data obtained from the dummy pixel region and non-reading pixel region. By so doing, the image processing controller does not have to receive image data during these output periods.

Also, in accordance with embodiments of the present invention, the image processing controller may supply an A/D conversion/transfer clock at a constant clock frequency even when the frequency of the shift/transfer clock changes.

However, it should be noted that the clock frequency of the A/D conversion/transfer clock to be supplied to the A/D converter may be variably controlled, depending on the type of image sensor used.

In accordance with other embodiments, the present invention relates to an image sensor controller that controls an image sensor having a light receiving section and a transfer section that receives image data from the light receiving section. The image sensor controller comprises a drive controller that supplies to the transfer section, which shifts and transfers received image data, a shift/transfer clock for shifting and transferring the image data. The drive controller includes a pattern selector that selects, from among a plurality of clock patterns for setting shift/transfer clock, a specific clock pattern for each period during which image data is outputted from the transfer section of the image sensor. The frequency of the shift/transfer clock supplied during a particular period is based on the specific clock pattern selected for that period. Thus, different clock patterns are selected according to output periods of the transfer section, and shift/transfer clocks based on the respective selected clock patterns are supplied to the transfer section of the image sensor. As a result, the degree of freedom in setting shift/transfer clocks to be supplied to the image sensor can be improved.

Also, the present invention relates to an electronic device comprising an image sensor that has a light receiving section and a transfer section that receives image data from the light receiving section, and any one of the image sensor controllers described above for controlling the image sensor.

Such an electronic device may also include a carriage on which the image sensor is mounted, a drive device that drives the carriage in a scanning direction, a servo controller that performs servo control on the drive device in accordance with servo control information read by the image sensor from a source. The servo control information may be in the form of printed matter that is provided in a detection area of the image sensor.

Also, the present invention relates to methods for controlling an image sensor having a light receiving section and a transfer section that receives image data from the light receiving section. The methods involve controlling the frequency of a shift/transfer clock for shifting and transferring image data by controlling the frequency of the shift/transfer clock based on the particular output period during which image data is outputted from the transfer section.

In one embodiment, the control is performed by making the frequency of the shift/transfer clock higher in a dummy pixel output period during which image data obtained from a dummy pixel region is outputted from the transfer section than in an effective pixel output period during which image data obtained from an effective pixel region is outputted from the transfer section.

In another embodiment, the control is performed by making the frequency of the shift/transfer clock higher in a non-reading pixel output period during which image data obtained from a non-reading pixel region is outputted from the transfer section than in a reading pixel output period during which image data obtained from a reading pixel region is outputted from the transfer section.

In a further embodiment, the control is performed by setting the frequency of the shift/transfer clock to a first frequency in a dummy pixel output period during which image data obtained from a dummy pixel region is outputted from the transfer section, setting the frequency of the shift/transfer clock to a second frequency in a non-reading pixel output period during which image data obtained from a non-reading pixel region is outputted from the transfer section, and setting the frequency of the shift/transfer clock to a third frequency in a reading pixel output period during which image data obtained from a reading pixel region is outputted from the transfer section.

Each of the above-described methods also includes supplying the shift/transfer clock to the transfer section which shifts and transfers received image data based on the frequency of the shift/transfer clock, and may further include selecting, from among a plurality of clock patterns for setting the shift/transfer clock, a specific clock pattern for each period during which image data is outputted from the transfer section of the image sensor.

BRIEF DESCRIPTION OF THE DRAWINGS

FIGS. 8(A)-(D) show pattern tables and their use in conjunction with other features according to embodiments of the invention.

FIG. 16 is a diagram including a timing waveform illustrating operations of a servo controller according to embodiments of the invention.

DESCRIPTION OF THE PREFERRED EMBODIMENTS

The embodiments described below in conjunction with the drawings are not intended as limiting, but rather are presented as exemplary arrangements of the present invention. As will be appreciated by those skilled in the art, not all structure/operation described in the present embodiments is necessarily indispensable in implementing a solution provided by the present invention.

Figure 1:
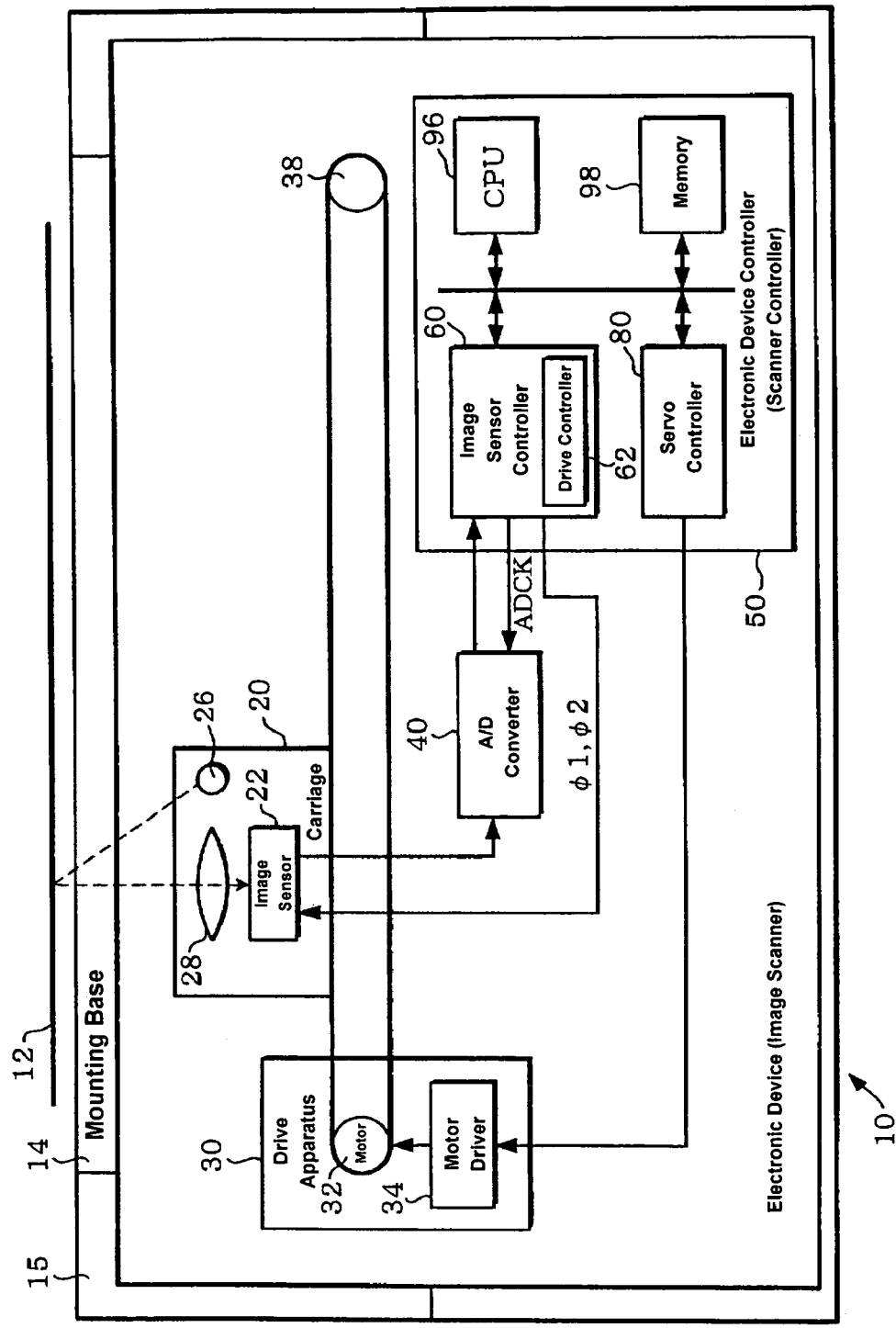
FIG. 1 is a block diagram illustrating an exemplary structure of an electronic device according to embodiments of the invention.

FIG. 1 shows an exemplary structure of an electronic device 10, which may be an image reading device, image scanner, or the like. As noted above, other configurations are possible, including configurations in which one or more of the illustrated components is omitted.

The electronic device 10 (e.g., a flat bed type image scanner) includes a frame 15 (e.g., a support member and housing) on which a generally rectangular mounting base 14 is carried for supporting a source object 12 (e.g., a printed document to be printed). The mounting base 14 may be formed from a light-transmitting material--glass, for example. The source object 12 is mounted on an upper surface of the light-transmitting mounting base 14.

The electronic device 10 includes a carriage 20, on which is mounted an image sensor 22 (image pickup device, line sensor, one-dimensional sensor or color sensor). A CCD, CIS, or BBD may be used as the image sensor 22. Also mounted on the carriage 20 is a light source 26 that generates light for irradiating the source object 12, and an optical system or head such as a lens 28 that converges light emitted from the light source 26 and reflected off of the source object 12 on the image sensor 22. A mirror or the like is mounted on the carriage 20 to deflect the light from the light source 26 or the reflected light from the source object 12 in order to lengthen or bend the optical path. A light sensor for detecting servo control information may be provided independently of the image sensor 22, and mounted on the carriage 20. Also, an A/D converter 40 and an electronic device controller 50 may be mounted on the carriage 20 or mounted separately.

The electronic device 10 includes a drive device 30 that drives and shifts the carriage 20. The drive device 30 includes a motor 32, and a motor driver 34 that drives the motor 32. Motor 32 may be, for example, a DC motor of the brush or brushless variety.

In response to being driven by the motor 32, the carriage 20 moves in an auxiliary scanning direction, i.e., generally perpendicular to a main scanning direction. The image sensor 22 is disposed with its longitudinal direction being coincident with the main scanning direction. A driving belt 36, which is mounted on a pulley 38, is rotated by the motor 32, such that the carriage 20 affixed on the driving belt 36 moves in the auxiliary scanning direction. It will be appreciated that this is but one of a variety of methods by which the carriage 20 may be moved. Other arrangements are possible in accordance with modified embodiments. For example, the carriage 20 may be moved without using the driving belt 36 which may be accomplished, for example, using a linear motor mechanism.

Analog image data (an analog image signal) that is generated by the image sensor 22 is input into the A/D converter 40 which converts such data into digital image data (a digital image signal) and outputs the same to an electronic device controller 50 (e.g., a scanner controller).

The electronic device controller 50 is configured to control image read processing or the like performed by the electronic device 10. More specifically, controller 50 performs servo control for moving the carriage 20, or control for driving the image sensor 22 mounted on the carriage 20. The electronic device controller 50 includes an image sensor controller 60 that controls the image sensor 22, generating control signals and driving patterns and outputting the same to the image sensor 22. Also, the image sensor controller 60 receives digital image data from the A/D converter 40, and performs a variety of image processing operations, such as gamma conversion, shading processing, and binary conversion processing.

The image sensor controller 60 includes a drive controller 62 that generates shift/transfer clocks $\phi1$, $\phi2$ (drive patterns, drive signals) and supplies them to the image sensor 22. The drive controller 62 supplies the image sensor 22 with clocks $\phi1$, $\phi2$ having different clock frequencies according to regions of pixels (dummy pixels, non-reading pixels, reading pixels) of the image sensor 22. In other words, it supplies the shift/transfer clocks $\phi1$, $\phi2$ such that clock frequencies, which are indicative of the rates of transferring image data, differ according to output periods of image data from the image sensor 22. More specifically, the drive controller 62 selects, from among a plurality of clock patterns, a particular clock pattern according to an output period of the image sensor 22 and supplies the shift/transfer clocks $\phi1$, $\phi2$ based on the selected clock pattern.

The clock patterns are clock waveform patterns having different clock frequencies, rise and fall clock pulse timings, and/or duties of clocks, which are stored in a memory or the like. The drive controller 62 selects, from among the clock patterns stored in the memory, an output-period-corresponding clock pattern and repeats the selected clock pattern at predetermined cycles (for example, in cycles of pixel processing units) to thereby generate shift/transfer clocks $\phi1$, $\phi2$.

The electronic device controller 50 includes a servo controller 80 that performs servo control (feedback control) on the motor 32 that drives the carriage 20. More specifically, servo controller 80 controls movement of the carriage 20 to desired positions (such as an initial position) or at desired speeds based on servo control information obtained in association with movements of the carriage 20 (i.e., information regarding the detected positions and speeds of the carriage 20).

The electronic device controller 50 includes a CPU 96 (processor) and a memory 98 (ROM, RAM). The CPU 96 performs overall controls of the electronic device controller 50, and exchanges information with the outside. Also, the memory 98 stores programs and various data, and functions as a work region for the image sensor controller 60, the servo controller 80 and the CPU 96.

As previously noted, the electronic device controller 50 does not necessarily include all the components shown in FIG. 1; it may have a structure in which a portion thereof is omitted. For example, the CPU 96 and the memory 98 may be omitted. Also, the functions of the electronic device controller 50, the image sensor controller 60 and the servo controller 80 may be realized by hardware circuits (e.g., one or more Application Specific Integrated Circuits (ASICs) or a general purpose processor), or may be realized by both software and hardware circuits.

Figure 2:
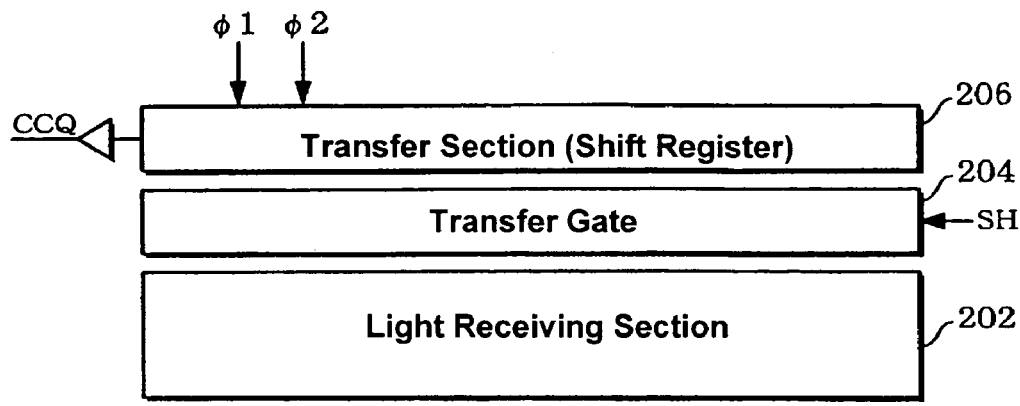
FIGS. 2(A)-(C) are diagrams illustrating an exemplary structure and operations of an image sensor according to embodiments of the invention.
Figure 2:
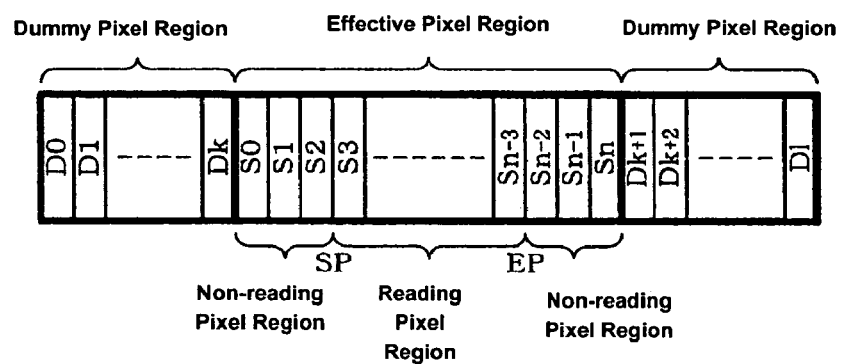
Figure 2:
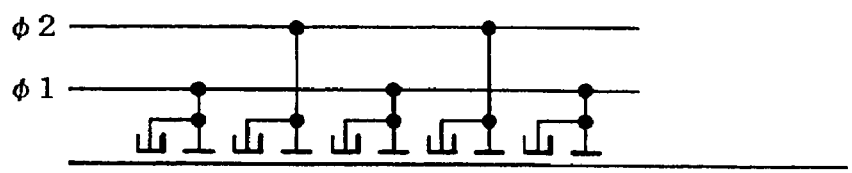

FIG. 2(A) shows an exemplary composition of the image sensor 22 (CCD line sensor). A light receiving section 202 includes a plurality of light receiving elements (photodiodes, pixels) that perform photoelectric conversion. As shown in FIG. 2(B), the light receiving section 202 is provided with an effective pixel region where effective pixels (light receiving elements) $S_0$-$S_n$ are disposed in a row, and dummy pixel regions where dummy pixels $D_0$-$D_k$ and $D_{k+1}$-$D_1$, which are not effective pixels, are disposed in a row. These dummy pixels are provided for no-load feeding or light-shield outputs.

Figure 3:
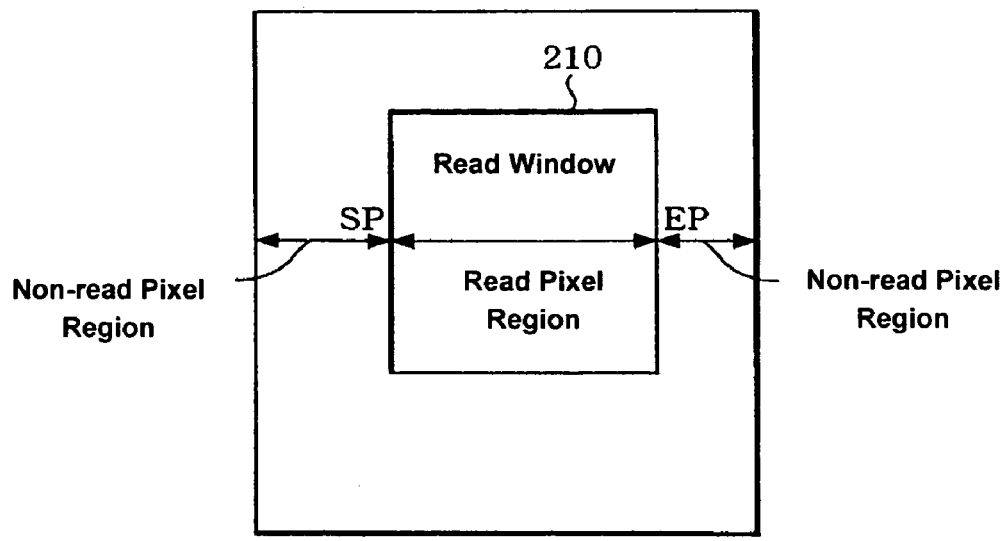
FIGS. 3(A) and (B) are diagrams illustrating an exemplary structure and operations of an image sensor according to embodiments of the invention.
Figure 3:
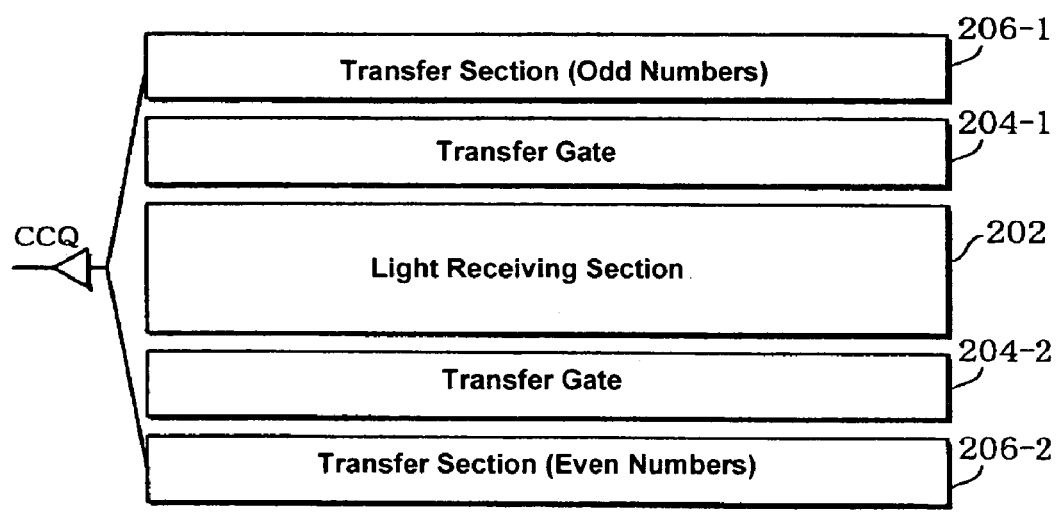

Also in the image scanner, a read window 210 for designating a reading range, such as the one indicated in FIG. 3(A), may be set by the user through an application program, such that image data only within this read window 210 is read. In this case, as shown in FIG. 3(A), a reading pixel region is defined as a region between a read starting position SP and a read ending position EP. Other regions (e.g., the one before SP and the one after EP) define non-reading pixel regions. Referring to FIG. 2(B), in an effective pixel region, the pixels $S_3$-$S_{n-3}$ between SP and EP define the reading pixel region, and the pixels $S_0$-$S_2$ and $S_{n-2}$-$S_n$ define respective non-reading pixel regions. It is noted that the positions of SP and EP that set the reading pixel region are not limited to those positions shown in FIG. 2(B). SP and EP may be set differently to provide a different reading pixel region. The reading and non-reading pixel regions may be collectively defined as the effective pixel region.

Each of the light receiving elements (e.g., pixels) of the light receiving section 202 generates and stores a charge according to the amount of light received. After a predetermined time period required for charge accumulation has passed, a shift signal SH becomes active, such that a transfer gate 204 turns on. In response, accumulated charge, which represents the analog image data, is transferred through the transfer gate 204 to a transfer section 206 which comprises a plurality of shift registers, one for each of the light receiving elements. Then, the image data (in the form of accumulated charge) is transferred between adjacent shift registers based on two phases of shift/transfer clocks φ1, φ2, and serially outputted from a CCQ terminal of the image sensor 22.

FIG. 2(C) shows an exemplary structure of a shift register of the transfer section 206 in connection with the transfer/shift clocks φ1, φ2.

The structure of the image sensor 22 is not limited to the one shown in FIG. 2(A). In another embodiment, shown in FIG. 3(B), a transfer gate 204-1 and a transfer section 206-1 for odd numbered pixels, and a transfer gate 204-2 and a transfer section 206-2 for even numbered pixels are provided. Also, in connection with either of the embodiments of the image sensor 22 (FIGS. 2(A) and 3(B)), a light receiving section, a transfer gate and a transfer section, for reading image data in each of red (R), green (G) and blue (B), are preferably provided.

In accordance with the invention, the frequencies or patterns of the shift/transfer clocks φ1, φ2 are made different according to output periods during which image data is outputted from the transfer section 206 of image sensor 22. For example, FIG. 4(A) shows an example of waveforms in which the clock frequencies of the clocks φ1, φ2 do not change during the output periods. In contrast, in accordance with an embodiment of the invention, the clock frequencies of the shift/transfer clocks φ1, φ2 are increased in dummy pixel output periods, as indicated by A1, A2 in FIG. 4(B).

The dummy pixel output period is a period during which image data for pixels (light receiving elements) in the dummy pixel regions ($D_0$-$D_k$, $D_{k+1}$-$D_1$ in FIG. 2(B)) are outputted from the transfer section 206. A non-reading pixel output period is a period during which image data for pixels in the non-reading pixel region ($S_0$-$S_2$, $S_{n-2}$-$S_n$) are outputted from the transfer section 206. A read pixel output region is a period during which image data for pixels in the reading pixel region ($S_3$-$S_{n-3}$) are outputted from the transfer section 206. The non-reading pixel output periods and the read pixel output region combined define an effective pixel output period. The clock frequencies of φ1, φ2 are faster in the dummy pixel output periods, as indicated by A1 and A2 of FIG. 4 (B), than the clock frequency in the effective pixel output period indicated by A7 in the figure.

The shift signal SH turns on the transfer gate 204 in FIG. 2(A). TCLK is a clock for counting the number of pixels. The A/D converter 40 shown in FIG. 1 outputs to the image sensor controller 60 digitally converted image data with a clock ADCK (A/D conversion/transfer clock) that is synchronized with TCLK Also, CCQ is an output of the transfer section 206 of image sensor 22.

Figure 4:
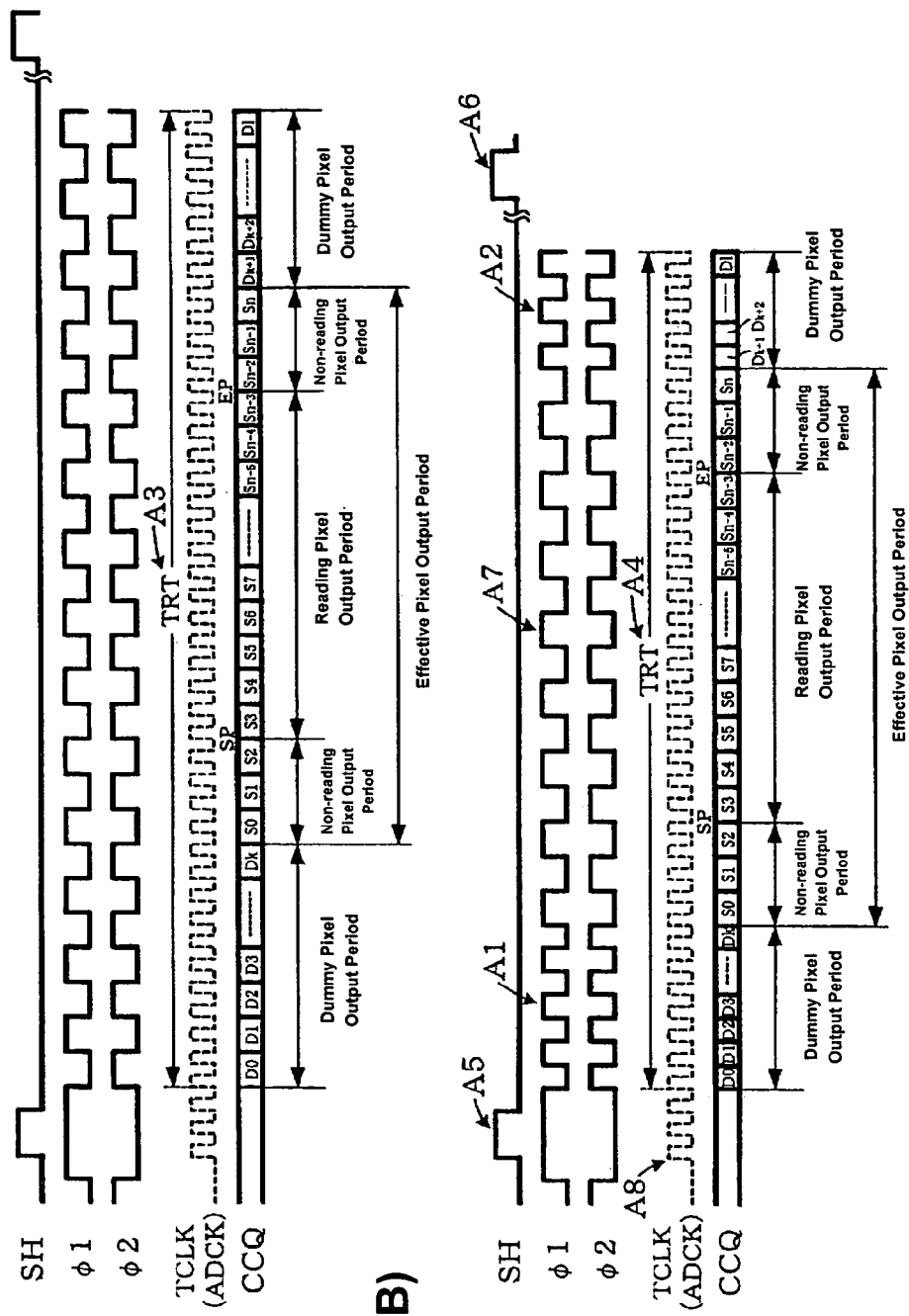
FIGS. 4(A) and (B) are timing diagrams illustrating one embodiment of the invention by comparison.

As indicated in FIG. 4(B), when the clock frequencies of φ1, φ2 are increased during the dummy pixel output periods, it can be seen by comparing A3 in FIG. 4(A) and A4 in FIG. 4(B) that the transfer time TRT, which is a time for the transfer section 206 to complete transferring image data for one line (3 lines for RGB), is decreased. Accordingly, as indicated by A5, A6 in FIG. 4(B), the time interval of pulses of shift signal SH can be shortened, such that the image reading speed can be increased. There is no problem in increasing the clock frequency during the dummy pixel output periods because image data for dummy pixels are unnecessary. Furthermore, since image data for effective pixels is transferred with a normal clock frequency as indicated by A7 in FIG. 4 (B), no inconvenience would occur in image data obtained. Accordingly, a faster image reading speed can be achieved while proper image data is read.

Figure 5:
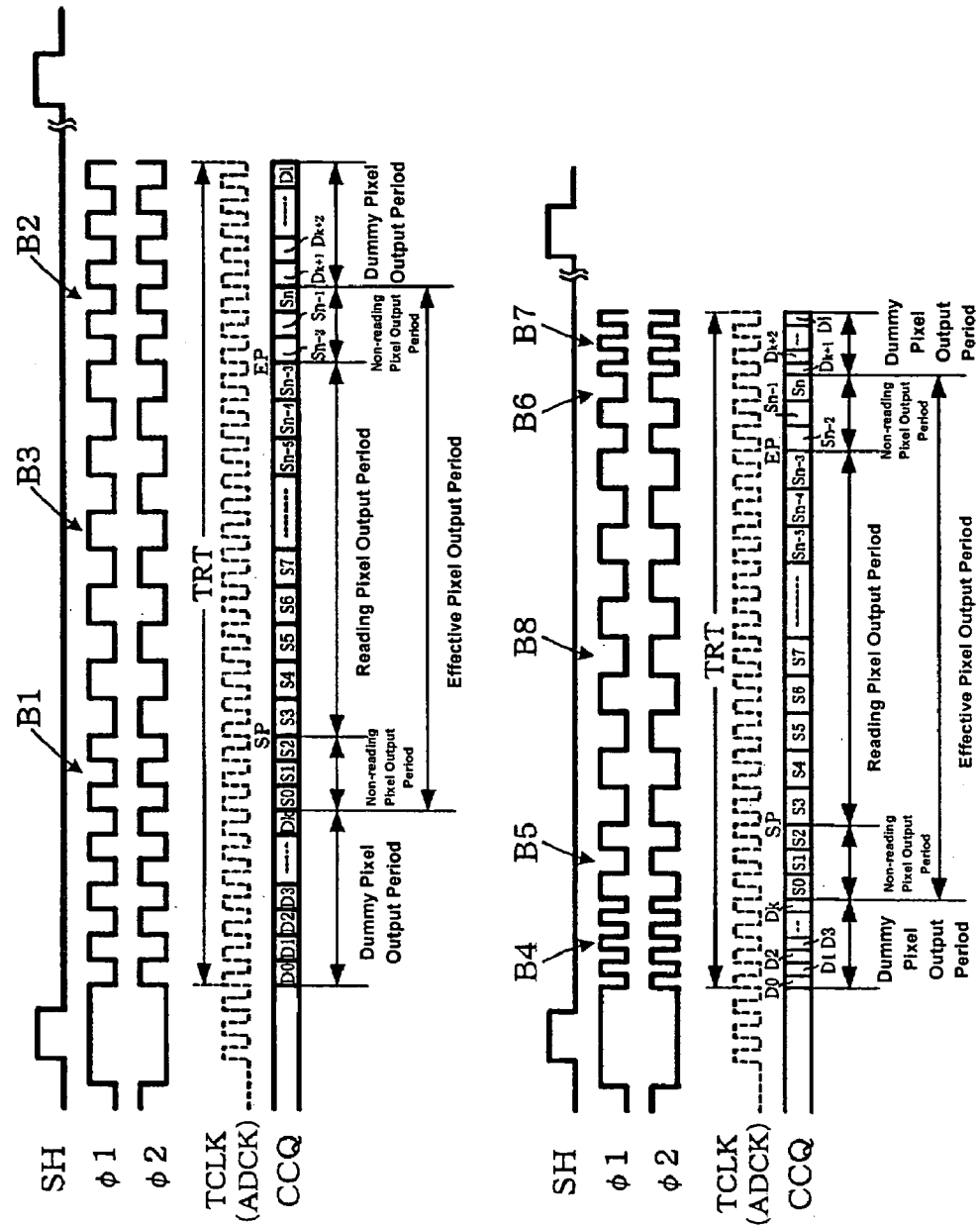
FIGS. 5(A) and (B) are examples of timing waveforms used in an image sensor control method in accordance with embodiments of the present invention.

In addition to increasing the clock frequencies φ1, φ2 during the dummy pixel output periods, such clock frequencies can also be increased during the non-reading pixel output periods, as indicated by B1, B2 in FIG. 5(A). Accordingly, the transfer time TRT (time interval of shift signals SH) can be further shortened as compared with the embodiment shown in FIG. 4(B), and an even faster image reading speed can be achieved. Moreover, when a reading range is designated by the read window 210 as indicated in FIG. 3(A), image data in the non-reading pixel regions are not required for the user. Accordingly, even when the clock frequencies of φ1, φ2 are made faster during the non-reading pixel output periods as indicated by B1, B2 in FIG. 5(A), the possibility of occurrence of data misreading is low. Furthermore, since image data in the reading pixel region is transferred with a normal clock frequency as indicated by B3 in FIG. 5(A), no inconvenience would occur in image data obtained.

In accordance with another embodiment, the clock frequencies of shift/transfer clocks φ1, φ2 are increased in all invalid data periods, which includes dummy pixel output periods and non-reading pixel output periods, as indicated by B4, B5, B6 and B7 in FIG. 5(B), but are not increased in the reading pixel output period. More specifically, the clock frequency in the dummy pixel output periods is made highest, the clock frequency in the non-reading reading pixel output periods is made second highest, and the clock frequency during the reading pixel output period is made lowest (a normal clock frequency is retained). By so altering the clock frequencies, the image reading speed can be further increased.

Since the non-reading pixel output periods are adjacent to the reading pixel output period, there is a possibility that the reading of image data in the reading pixel regions may be adversely affected if the shift/transfer clocks φ1, φ2 are made excessively fast during the non-reading pixel output periods. On the other hand, when the frequencies of clocks φ1, φ2 are increased during dummy pixel output periods, there is less possibility that the reading of image data in the reading pixel regions will be adversely affected. Accordingly, as indicated by B4, B5 and B8 in FIG. 5(B), by changing the clock frequencies of φ1, φ2 in stages from a faster frequency to a normal frequency, reading of image data in the reading pixel regions is prevented from being adversely affected, while a faster image reading speed can be achieved.

It will be appreciated that methods for controlling the frequencies of shift/transfer clocks are not limited to those described with reference to FIG. 4 (B) and FIGS. 5(A) and (B). As one skilled in the art will recognize, a variety of modifications can be implemented. For example, additional stages may be added, in which, for example, the clock frequencies are changed in stages during the dummy pixel output period, and the clock frequencies are further changed in stages during the non-reading pixel output period. Also, when RGB image data is to be read, the number of clocks φ1, φ2 and the number of shift signals SH may be increased.

Figure 6:
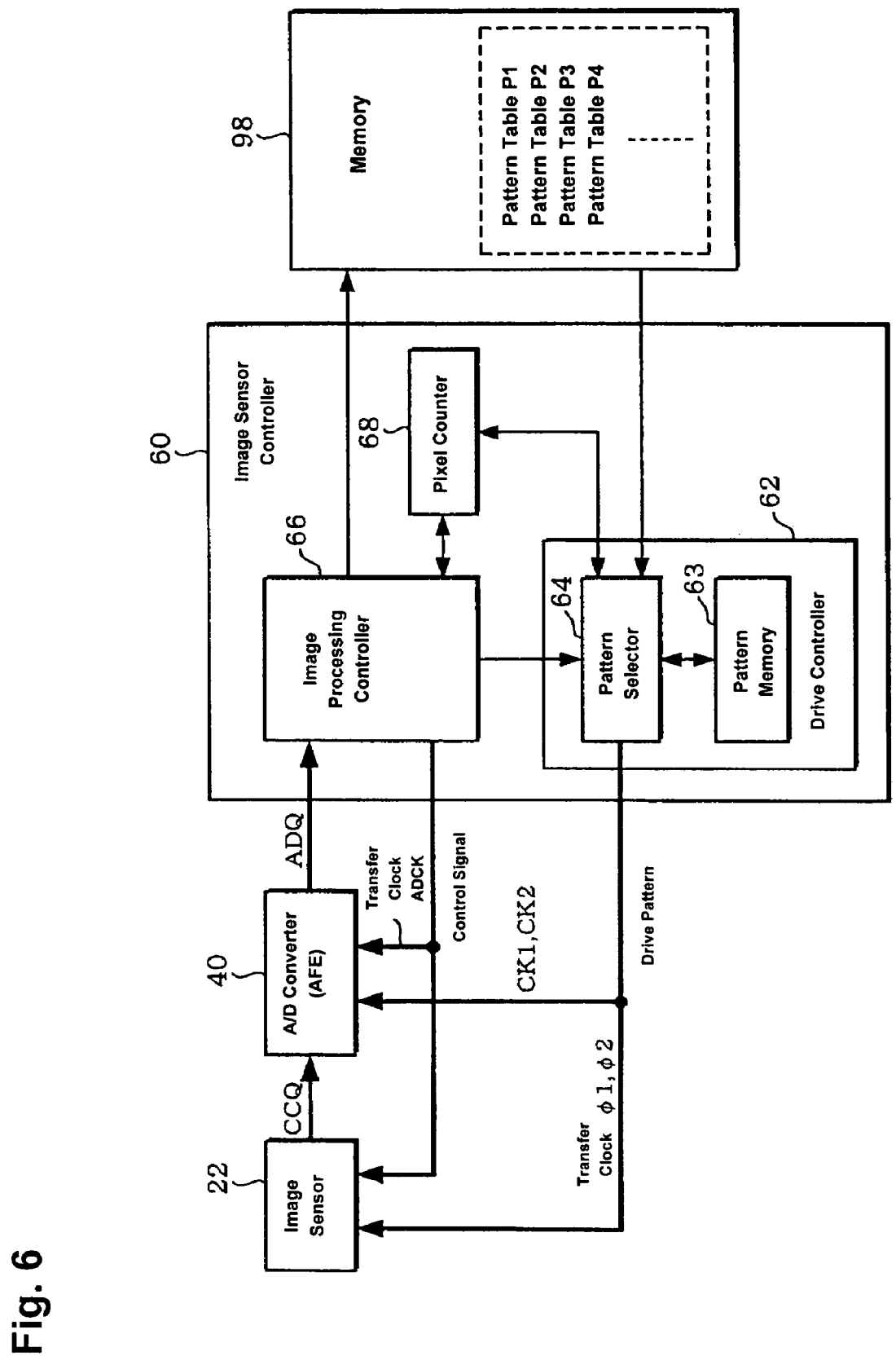
FIG. 6 is a block diagram illustrating an exemplary structure of an image sensor controller.

FIG. 6 shows an exemplary structure of the image sensor controller 60. It is noted that the image sensor controller 60 need not necessarily include all the components shown in FIG. 6; a portion thereof may be omitted. The drive controller 62 supplies drive patterns (drive signals) to the image sensor 22 and A/D converter 40. The drive patterns may include the shift/transfer clocks φ1, φ2 and the shift signal SH, which are described with reference to FIG. 2(A) through FIG. 5(B). Also, signals CK1, CK2, which determine sampling timings of analog image data at the A/D converter 40, can be included.

The drive controller 62 includes a pattern selector 64 that selects a particular pattern table (clock pattern) from among a plurality of pattern tables (clock patterns) according to the type of output period of image sensor 22 to set the drive pattern of φ1, φ2 for that output period. A pattern memory 63 temporarily stores the pattern tables (clock patterns) from which the pattern selector 64 selects. More specifically, pattern tables that are to be used at the time of actual driving operations are read out from the memory 98, and written in the pattern memory 63. For example, when pattern tables P1, P2 and P3 are to be used in the dummy, non-reading and reading pixel output periods, respectively, these pattern tables P1, P2 and P3 are transferred to and stored in the pattern memory 63. In one arrangement, P1 is set between the first and second addresses of the pattern memory 63, P2 is set between the second and third addresses, and P3 is set between the third and fourth addresses. The pattern selector 64 selects from among these pattern tables (clock patterns) P1, P2 and P3 the pattern table that is designated for the given output period, and generates the drive pattern based on the selection.

The A/D converter 40 receives analog image data CCQ from the transfer section 206 of image sensor 22 and converts the same into digital image data ADQ. An image processing controller 66 supplies a transfer clock ADCK (A/D conversion/transfer clock) to the A/D converter 40, and receives digital image data ADQ from the A/D converter 40 based on ADCK. Then, image processing operations such as a gamma conversion, shading processing or binary-conversion processing are rendered on the digital image data.

A pixel counter 68 counts the number of pixels. More specifically, it starts counting when SH becomes active, i.e., at a timing indicated by A8 in FIG. 4(B). Then, each time TCLK becomes active (high), the number of pixels is incremented. The drive controller 62 and the image processing controller 66 perform processing based on the counted value of the number of pixels provided from the pixel counter 68. For example, the drive controller 62 judges based on the counted value of the number of pixels if the current output period is a dummy pixel output period, a non-reading pixel output period, or a reading pixel output period, and selects and reads out a pattern table from the pattern memory 63 according to the determined output period. By so doing, a pattern table (clock pattern) designated for a particular output period of the image sensor can be selected from a plurality of pattern tables.

Figure 7:
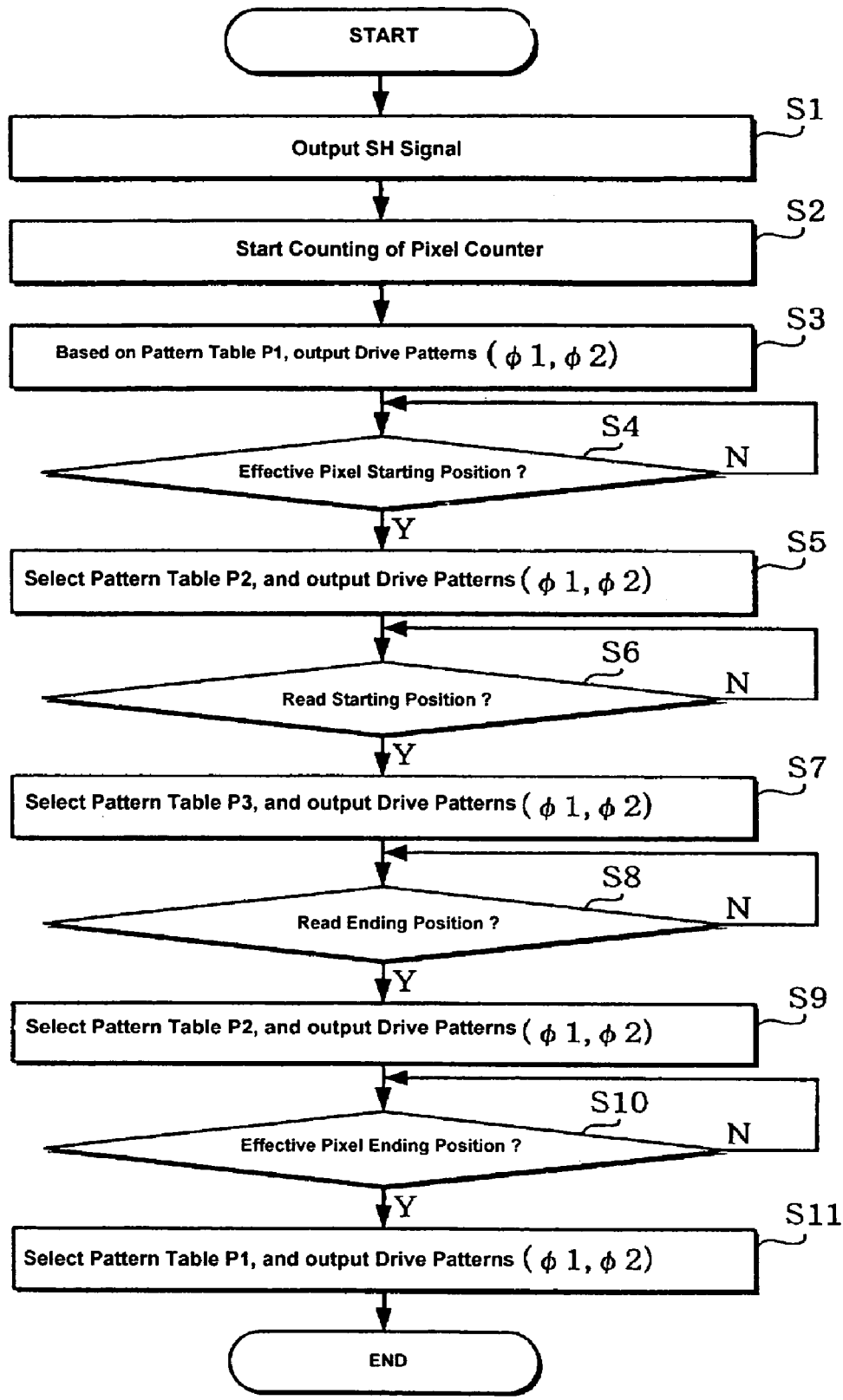
FIG. 7 is a flow chart illustrating operations of an image sensor controller according to embodiments of the invention.

Next, operations of the image sensor controller 60, in accordance with an embodiment if the invention, are described using a flow chart in FIG. 7. First, a shift signal SH is outputted (step S1). Then, the counting operation of the pixel counter 68 is started (step S2). Next, based on selected pattern table P1, drive patterns (for clocks φ1, φ2) are outputted (step S3). More specifically, the pattern selector 64 reads the pattern table P1 from the pattern memory 63, and repeats the patterns of P1 in cycles of pixel (RGB) processing units, to generate drive patterns.

For example, as indicated in FIG. 8(A), in accordance with one embodiment, a shortened pattern table P1 (first clock pattern) for dummy pixels, a shortened pattern table P2 (second clock pattern) for non-reading pixels, and a shortened pattern table P3 (third clock pattern) for reading pixels are stored in the pattern memory 63. The pattern tables P1, P2 and P3 define waveforms of drive patterns of shift/transfer clocks φ1, φ2, as indicated in FIG. 8 (B). More specifically, they describe how φ1 and φ2 are to be changed each time an ADR (an address of internal state that is synchronized with a reference clock of the image sensor controller 60) is incremented. Thus, in step S3, the shortened pattern table P1 for dummy pixels is selected among the pattern tables P1, P2 and P3 shown in FIG. 8(A).

Returning to FIG. 7, next a determination is made as to whether the output has reached an effective pixel starting position ESP (step S4). When it has, a shortened pattern table P2 (second clock pattern) for non-reading pixels is selected, and drive patterns ($\phi1$, $\phi2$) are outputted (step S5). In this way, as indicated by C1, C2 in FIG. 8(C), the pattern table P1 (first clock pattern) is selected in a dummy pixel output period, and the pattern table P2 (second clock pattern) is selected in the non-reading pixel output period.

Next, a determination is made as to whether the output has reached a read starting position SP (step S6). When it has, a shortened pattern table P3 (third clock pattern) for reading pixels is selected, and corresponding drive patterns ($\phi1$, $\phi2$) are outputted (step S7). Thus, the pattern table P3 (third clock pattern) is selected in the reading pixel output period, as indicated by C3 in FIG. 8(C).

Next, a determination is made as to whether the output has reached a read ending position EP (step S8). When it has, a shortened pattern table P2 (second clock pattern) for non-reading pixels is selected, and corresponding drive patterns ($\phi1$, $\phi2$) are outputted (step S9). Thus, the pattern table P2 (second clock pattern) is selected in the non-reading pixel output period that follows the reading pixel output period, as indicated by C4 in FIG. 8(C).

Next, a determination is made as to whether the output has reached an effective pixel ending position EEP (step S10). When it has, a shortened pattern table P1 (first clock pattern) for dummy pixels is selected, and corresponding drive patterns ($\phi1$, $\phi2$) are outputted (step S11). Thus, the pattern table P1 (first clock pattern) is selected in the dummy pixel output period that follows the non-reading pixel output period, as indicated by C5 in FIG. 8(C).

It is noted that, when the same clock frequency is used for the non-reading pixel output period and the reading pixel output period (in the case of FIG. 4(B)), steps S5, S6, S8 and S9 in FIG. 7 are not necessary. In such an embodiment, the pattern tables P1 and P3 (first and third clock patterns) are selected as indicated in FIG. 8(D).

In accordance with these embodiments, drive patterns (shift/transfer clocks $\phi1$, $\phi2$) are supplied to the image sensor 22 based on pattern tables (clock patterns) selected from the pattern memory 63, and pattern switch timing setting information. In the embodiment of FIG. 7, that information includes effective pixel starting position ESP, read starting portion SP, read ending position EP, and effective pixel ending position EEP.

A variety of drive patterns can be generated simply by software manipulation, without adding modifications to the hardware circuit. For example, by simply rewriting contents of the pattern tables stored in the memory 98 (pattern memory 63) and appropriately adjusting the control aspect of the software, the clock frequencies of the shift/transfer clocks $\phi1$, $\phi2$ to be supplied in each output period can be changed. In other words, a variety of shift/transfer clock patterns such as those indicated in FIG. 4(B), FIG. 5(A) and FIG. 5(B) can be created and programmed for selected use.

Also, the read starting position SP and the read ending position EP (pattern switch timing setting information) can be changed using software, so that user changes to the read window 210 indicated in FIG. 3(A) can be accommodated. In other words, even when the read window 210 is changed to different ranges, the clock frequencies of shift/transfer clocks $\phi1$, $\phi2$ in non-reading pixel output periods can always be set to higher values by simply changing the settings of SP and EP.

Furthermore, by changing the settings of the effective pixel starting position ESP, and the effective pixel ending position EEP, a variety of different kinds of image sensors having different arrangements of dummy pixel regions and effective pixel regions can be readily accommodated. In other words, when an image sensor having a broad dummy pixel region or an image sensor having a narrow dummy pixel region is used, the clock frequencies of shift/transfer clocks $\phi1$, $\phi2$ in dummy pixel output periods can always be set to higher values by only changing the settings of ESP and EEP.

As shown in FIG. 9(A), a transfer clock ADCK (a clock for taking image data) having a constant clock frequency is supplied to the A/D converter 40 even when the clock frequencies of shift/transfer clocks $\phi1$, $\phi2$ change. More specifically, as indicated in FIG. 4(B) and FIGS. 5(A) and (B), the clock frequency of the ADCK (A/D conversion/transfer clock) is not changed, even when the clock frequencies of $\phi1$, $\phi2$ (shift/transfer clocks) change according to output periods. By supplying ADCK having a constant clock frequency, the A/D converter 40 can be normally operated.

Figure 9:
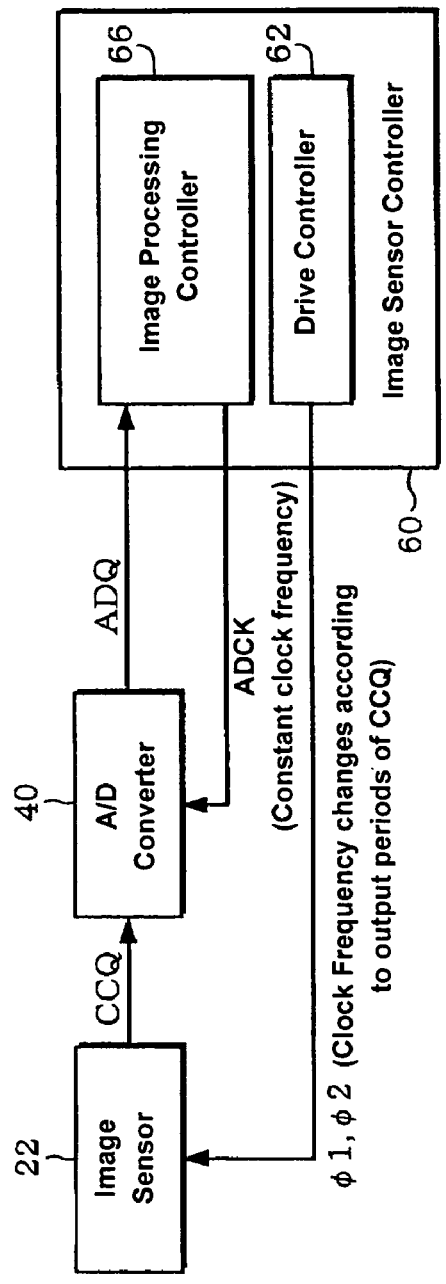
FIGS. 9(A)-(C) are diagrams illustrating the function of an A/D converter in conjunction with other components of the invention according to embodiments of the invention.
Figure 9:
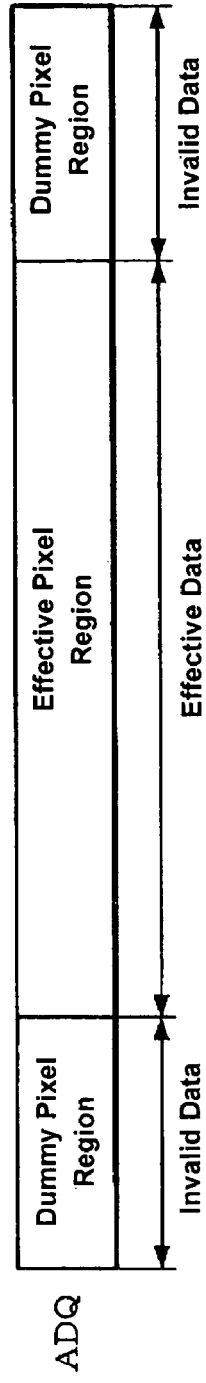
Figure 9:
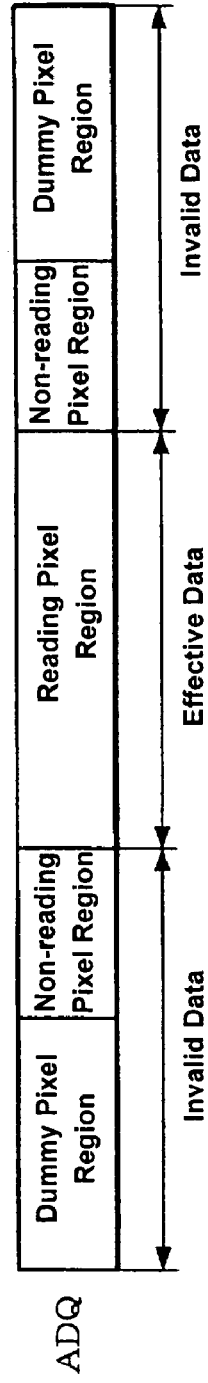

In accordance with an embodiment of the invention, as indicated in FIG. 9 (B), image data for dummy pixel regions received from the A/D converter 40 are treated by the image processing controller 66 as invalid data that is ignored and no image processing rendered thereon. In another embodiment, as indicated in FIG. 9(C), image data for dummy pixel regions and non-reading pixel regions received from the A/D converter 40 are treated as invalid data. Whether or not image data from the A/D converter 40 belong to dummy pixel regions or non-reading pixel regions can be determined based on a counted value of the number of pixels provided from the pixel counter 68 in FIG. 6.

The clock frequency of ADCK that is supplied to the A/D converter 40 may be limiting factor restricting the upper limit of image reading speed. With the use of a high-speed image sensor, the speed of the shift/transfer clocks $\phi1$, $\phi2$ may be increased. However, since the A/D converter 40 requires a long processing time to perform A/D conversion, the frequency of ADCK cannot be increased. Moreover, since the clock frequency of ADCK (TCLK) in FIG. 4(A) cannot be increased, the transfer time TRT cannot be shortened and the time interval between pulses of the shift signals SH cannot be shortened either. In the case in which the image data is RGB data that is converted in parallel by the A/D converter 40, the processing time required for A/D conversion becomes even longer, and the upper limit of the clock frequency of ADCK is further restricted.

Accordingly, in accordance with embodiments of the present invention, the clock frequency of ADCK is set to, for example, the highest clock frequency within its limitation. Then, without regard to output periods of the image sensor 22, ADCK is set to its highest clock frequency and constantly supplied at that frequency to the A/D converter 40. In this way, image data for the reading pixel region (effective pixel region) is appropriately converted by the A/D converter 40 based on ADCK at its highest clock frequency, and inputted in the image processing controller 66. As a result, an optimum high-speed reading rate in the reading pixel region can be achieved.

It should be noted though that clock frequency of ADCK that is supplied to the A/D converter 40 need not be the highest in all cases. Rather, the clock frequency of ADCK may be variably adjusted according to the kind of the image sensor 22 that is used.

In any case, image data in the dummy pixel regions and non-reading pixel regions are unnecessary data, and do not need an appropriate conversion by the A/D converter 40. The present invention focuses on this aspect and adopts a method in which only φ1, φ2 are made faster and ADCK is set at a constant clock frequency for dummy pixel regions and non-reading pixel regions. By making φ1, φ2 faster, as described above with reference to FIG. 4 (B)-FIG. 5(B), the transfer time TRT becomes shorter, and the image reading speed can be increased without making ADCK faster. In accordance with the present invention, no problem occurs in the output of the A/D converter 40 because image data for dummy pixel regions and non-reading pixel regions are treated as invalid data, as indicated in FIGS. 9(B) and (C), and not subject to image processing or outputted to circuits in succeeding stages. By using the method in accordance with the present invention, even when the clock frequency of ADCK becomes a limiting factor in image reading speed, an optimum high-speed image reading speed can be realized.

Figure 10:
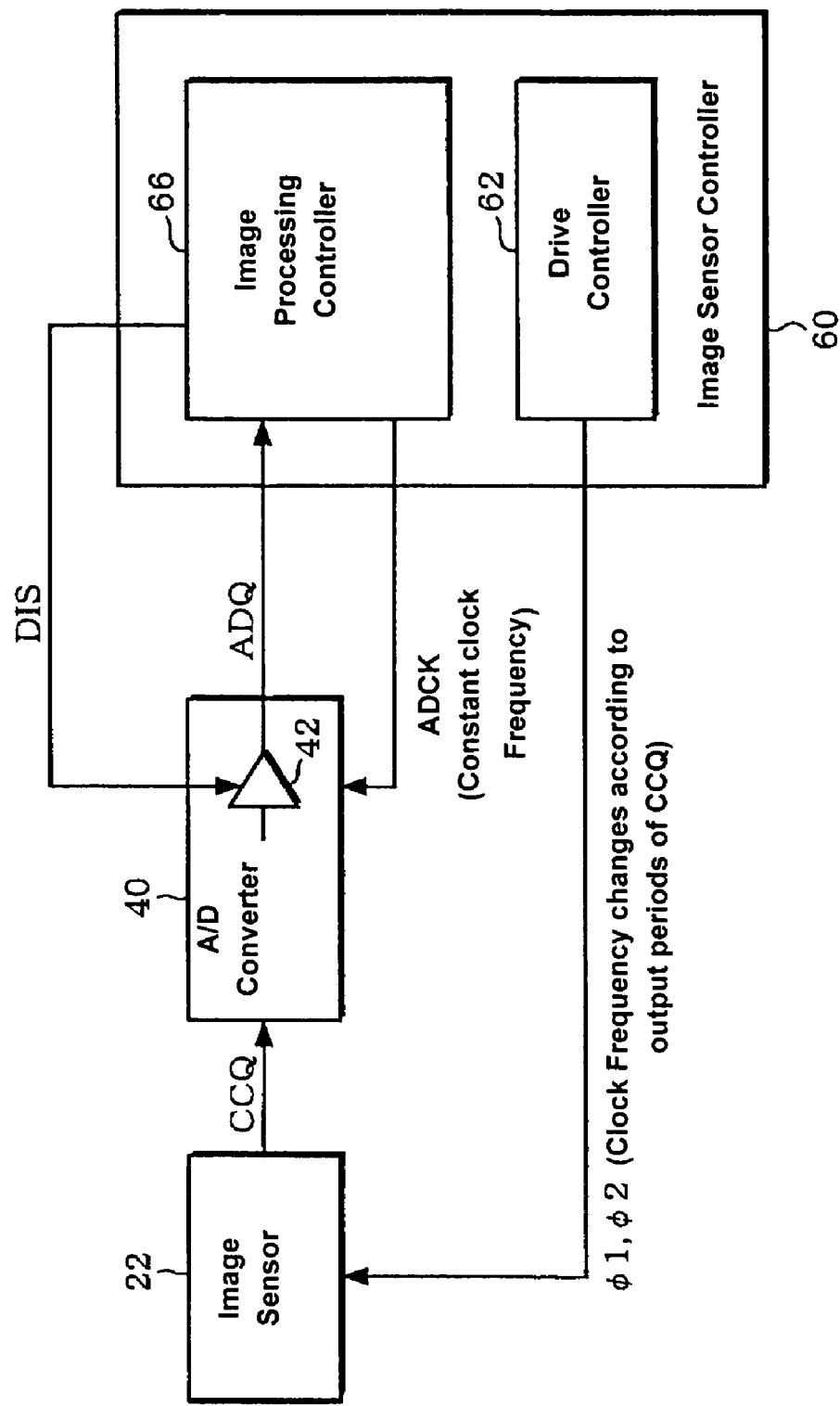
FIG. 10 is a block diagram illustrating control of an A/D converter according to embodiments of the invention.

In the embodiments described above in connection with FIG. 9(A), image data for dummy pixel regions only or image data for dummy and non-reading pixel regions are treated as invalid data, as illustrated in FIGS. 9(B) and (C) respectively. Thus, effective data may include reading and non-reading pixel regions or just the reading pixel region. However, the present invention is not limited to these embodiments. For example, as indicated in FIG. 10, another method may be used, wherein the output operation of the A/D converter 40 is disabled during periods in which image data for dummy pixel regions and non-reading pixel regions are outputted from the A/D converter 40. More specifically, a buffer 42 with a disable terminal may be used as a buffer that outputs image data ADQ. During periods in which image data for dummy pixel regions and non-reading pixel regions are outputted, a disable signal DIS to be inputted in the disable terminal of the buffer 42 is made active. As a result, error image data that are read in dummy pixel regions and non-reading pixel regions are not outputted from the A/D converter 40, such that an appropriate image reading processing can be realized.

Figure 11:
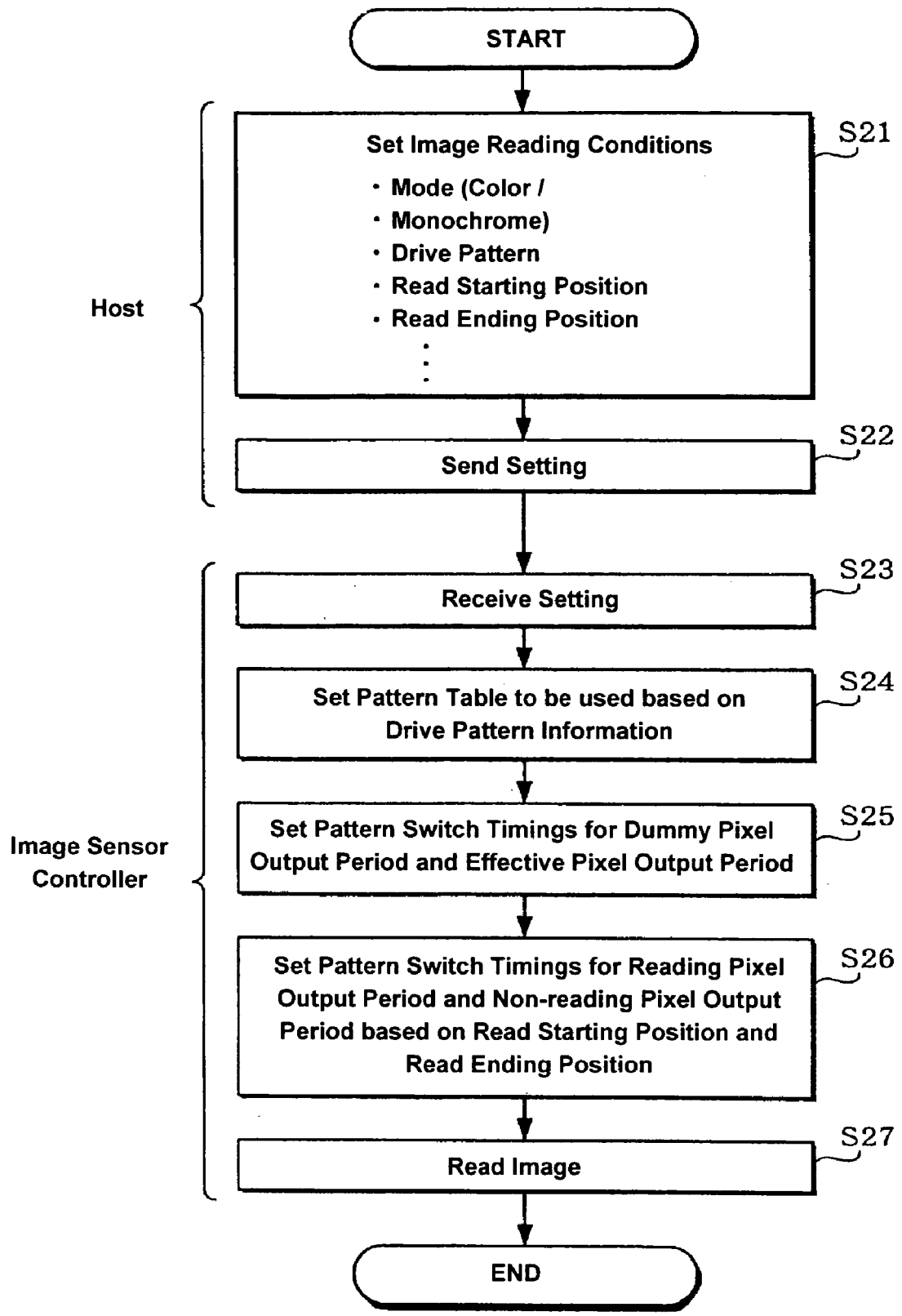
FIG. 11 is a flow chart illustrating a method for setting image reading conditions according to embodiments of the invention.

Next, referring to a flow chart in FIG. 11, a process for setting image reading conditions is described. First, a host (CPU and application program) sets image reading conditions (steps S21). Image reading conditions to be set may include the mode (color/monochrome), drive pattern, read starting position SP, read ending position EP, and resolution. Next, the set image reading conditions are transmitted to the image sensor controller 60 (electronic device controller 50) (step S22).

The image sensor controller 60 receives the setting (step S23). Based on drive pattern information, pattern tables to be used are set (step S24). Next, pattern switch timings for dummy pixel output periods and effective pixel output period (ESP, EEP in FIG. 8(C)) are set (step S25). Then, based on the reading start position SP and the reading end position EP, pattern switch timings for reading pixel output period and non-reading pixel output periods are set (step S26). Then, the image reading processing is started (step S27). As a result, the image reading processing can be executed based on the conditions set by the host.

Figure 12:
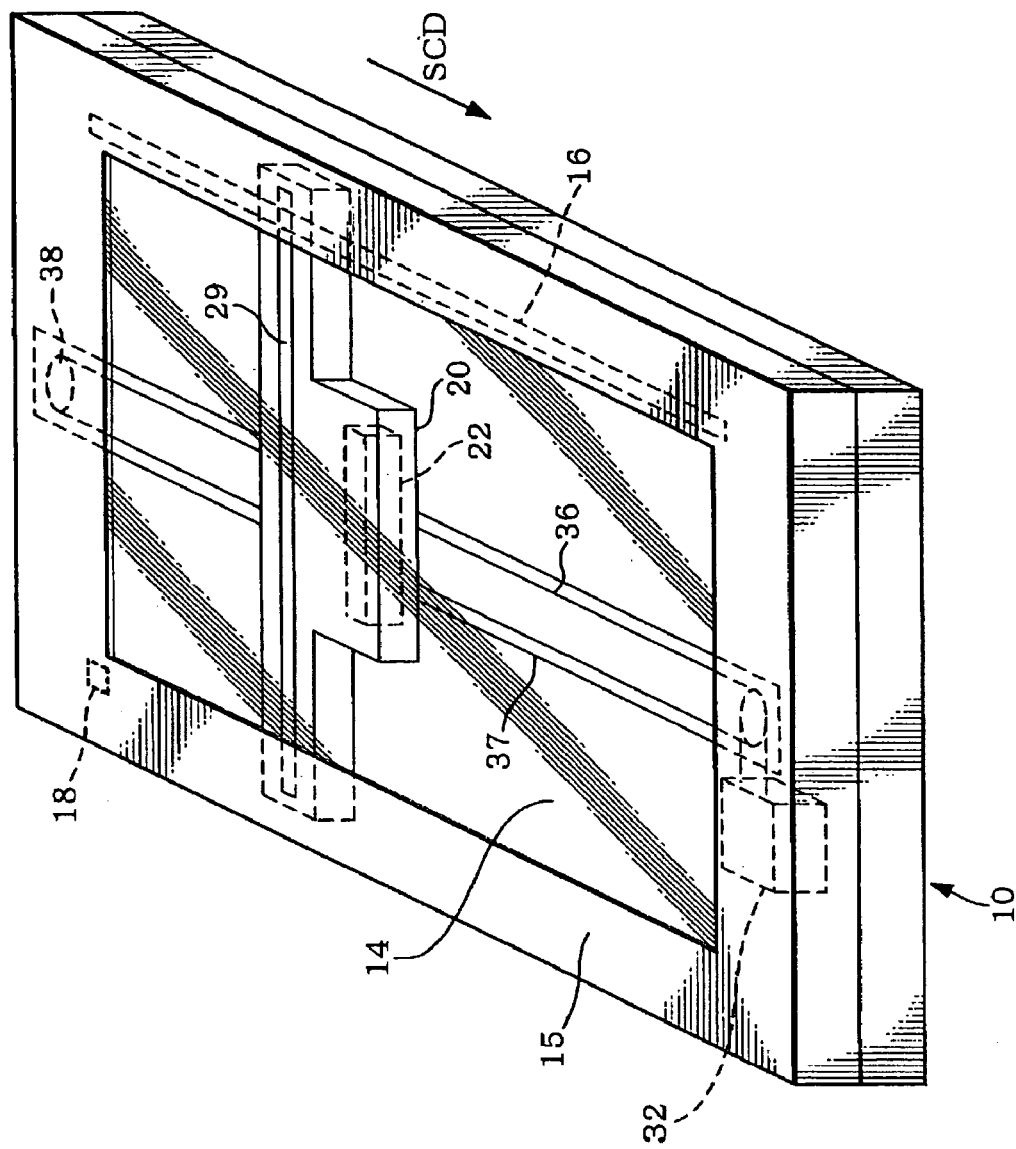
FIG. 12 is perspective view of an electronic device showing its various components according to embodiments of the invention.

Next, an example of an electronic device that uses a servo controller in accordance with embodiments of the present invention is described. Referring to FIG. 12, printed matter 16 and 18 for servo control is disposed on the electronic device 10. More specifically, printed matter 16, 18 composed of barcodes or the like are disposed on a rear or underside surface of a structure that includes the mounting base 14 and a portion of the supporting frame 15. By way of reference, the opposite surface is where an object to be read is placed.

Then, the image sensor 22 mounted on the carriage 20 reads servo control information (printed information for controlling the speed and position of the carriage 20 or the like) contained in the printed matter 16 and 18, as well as text/images of the source object placed on the mounting base 14. More specifically, a detection area corresponding to an opening section 29 of the carriage 20 (which is an area above the opening section 29 and has generally the same shape as the opening section 29) is irradiated by the light from the light source 26 (see FIG. 1) mounted on the carriage 20. Reflected light of the irradiated light (light reflected on the source object and printed matter) is converged by the lens 28 of the optical system (see FIG. 1), and the converged light is detected by the image sensor 22 to thereby read the servo control information in the printed matter 16 and 18 and the text/images on the reading object.

Then, based on the read servo control information, the servo controller 80 in FIG. 1 performs servo control of the motor 32 to thereby control the speed and position of the carriage 20. More specifically, the drive belt 36 is rotated by the motor 32, such that the carriage 20 is moved along a guide 37 in the auxiliary scanning direction. In so doing, the speed and position of the carriage 20 are controlled based on the servo control information provided in the printed matter 16 and 18, while the images/text on the source object placed on the mounting base 14 are read.

In conventional electronic devices such as image scanners, facsimiles and copiers, a rotary encoder with a linked gear attached to a motor shaft and a photo interrupter that detects rotations of the rotary encoder is typically used to control movements of the carriage 20. Also, a position sensor to determine an initial position (home position) of the carriage 20 is separately provided to control the initial position of the carriage 20. The additional parts including the separate sensor increases the complexity of such a device, makes it more time-consuming to assemble at the factory, and poses as an obstacle to lowering the cost of such electronic devices.

In contrast, in accordance with embodiments of the present invention, the printed matter 16 and 18 are merely disposed on the electronic device 10. Thus, the image sensor 22 that reads images on a source object can also be used to read servo control information. Another sensor is not required. In fact, the entire optical system for the image sensor 22 (including the light source 26, lens 28 and the like in FIG. 1) can be used as an optical system that also reads the servo control information on the printed matter 16 and 18. Thus, with the present invention, the number of parts can be reduced, the work for mounting parts can be reduced, and the cost of electronic devices employing this technology can be lowered.

The servo control information in the printed matter 16 and 18 may be read by dummy pixel regions (preferably, a plurality of dummy pixels) of the image sensor 22. More specifically, the servo control information in the printed matter 16 can be read by a dummy pixel region ($D_{k+1}$-$D_1$ in FIG. 2(B)) on one end side (e.g., the right side) of the light receiving section 202), while the servo control information in the printed matter 18 can be read by a dummy pixel region ($D_0$-$D_k$ in FIG. 2(B)) on the other end side (e.g., the left side) of the light receiving section. By reading the servo control information in the printed matter 16 and 18 using the dummy pixel regions, the dummy pixel regions, which are not necessary for the reading processing to read effective image data, can be effectively used.

Also, as described above with reference to FIGS. 4(B)-5(B), when the clock frequencies of the transfer clocks φ1, φ2 are made high in dummy pixel output periods, the A/D conversion performed by the A/D converter 40 cannot catch up the speed, and therefore correct image data cannot be obtained for the dummy pixel regions. However, the servo control information on the printed matters 16 and 18 is not required to have a very high reading resolution, and a reading resolution that can make a determination of black or white is sufficient. Accordingly, even when the resolution in reading image data in dummy pixel regions is lowered as a result of making the transfer clocks φ1, φ2 faster, servo control information that is sufficient for controlling the movements of the carriage 20 can be obtained. Therefore, there the advantage of increasing the image reading speed can be realized by making the clock frequencies of the transfer clocks φ1, φ2 faster during dummy pixel output periods while still realizing appropriate servo control.

While a separate optical sensor system for reading servo control information is not necessary as explained above, one may be provided if desired. A sensor may be mounted on the carriage 20 (for example, adjacent to image sensor 22) to read servo control information in the printed matter 16 and 18. More specifically, a first optical sensor for reading servo control information (speed control information) in the printed matter 16 may be provided adjacent to the right side of the image sensor 22, and a second optical sensor for reading servo control information (position control information) in the printed matter 18 may be provided adjacent to the left side of the image sensor 22. The servo control is then performed based on the servo control information read by the first and second optical sensors to thereby control the speed and position of the carriage 20.

Figure 13:
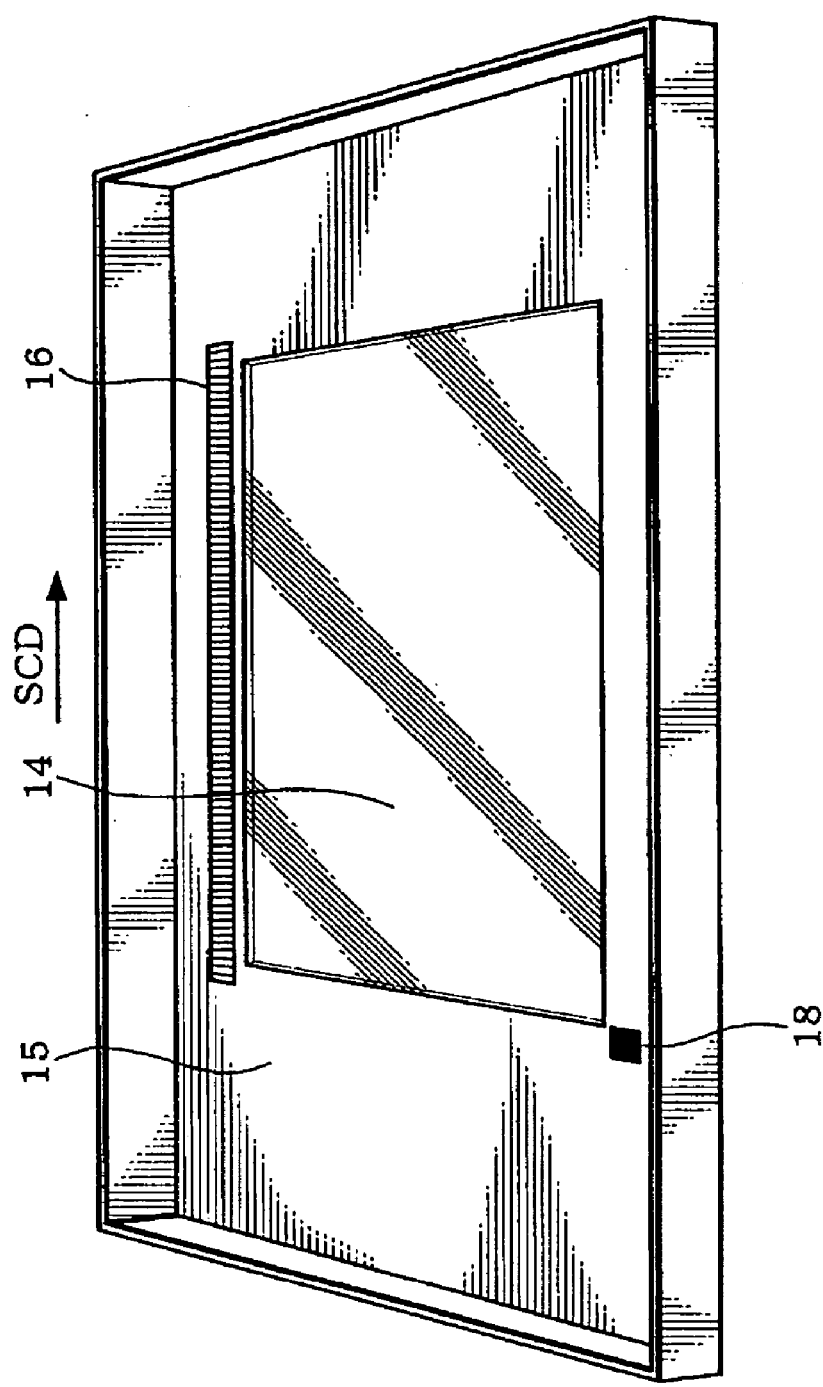
FIG. 13 illustrates positions where source objects (e.g., printed materials) are disposed.

Printed matter 16 and 18 are provided in detection areas (which are areas that can be detected by the image sensor; areas irradiated by the light source 26 in FIG. 1; or areas that oppose to the opening section 29 in FIG. 12) to be detected by the image sensor 22 that is mounted on the carriage 20. More specifically, as indicated in FIG. 13, the printed matter 16 and 18 may be disposed on the rear or underside surface of the frame 15 that supports the mounting base 14. Note that FIG. 13 is a perspective view of the frame 15 (removed from the electronic device 10) as seen from the image sensor side. Thus, the opposite (i.e., the front or upper) surface of the frame 15 is in the same plane as the surface of the mounting base 14 on which an object to be read is placed.

Servo control information, which is information for controlling the speed, position of the carriage 20 and the like, is printed in printed matter 16 and 18. More specifically, servo control information for controlling the speed of the carriage 20 may be printed in the printed matter 16. As the printed matter 16 for speed control, a barcode composed of bars of a predetermined color such as black or white arranged at predetermined intervals (intervals according to speeds) can be used. Also, the printed matter 16 may be rectangular and disposed along the auxiliary scanning direction (e.g., SCD direction shown in FIGS. 12 and 13). Servo control information for detecting an initial position of the carriage 20 may be printed in the printed matter 18. As the printed matter 18 for initial position detection, printed matter that is painted in a predetermined color such as black or white (which can be considered as one type of barcode) can be used. Also, the printed matter 18 is preferably disposed in a location corresponding to the initial (home) position of the carriage 20.

Figure 14:
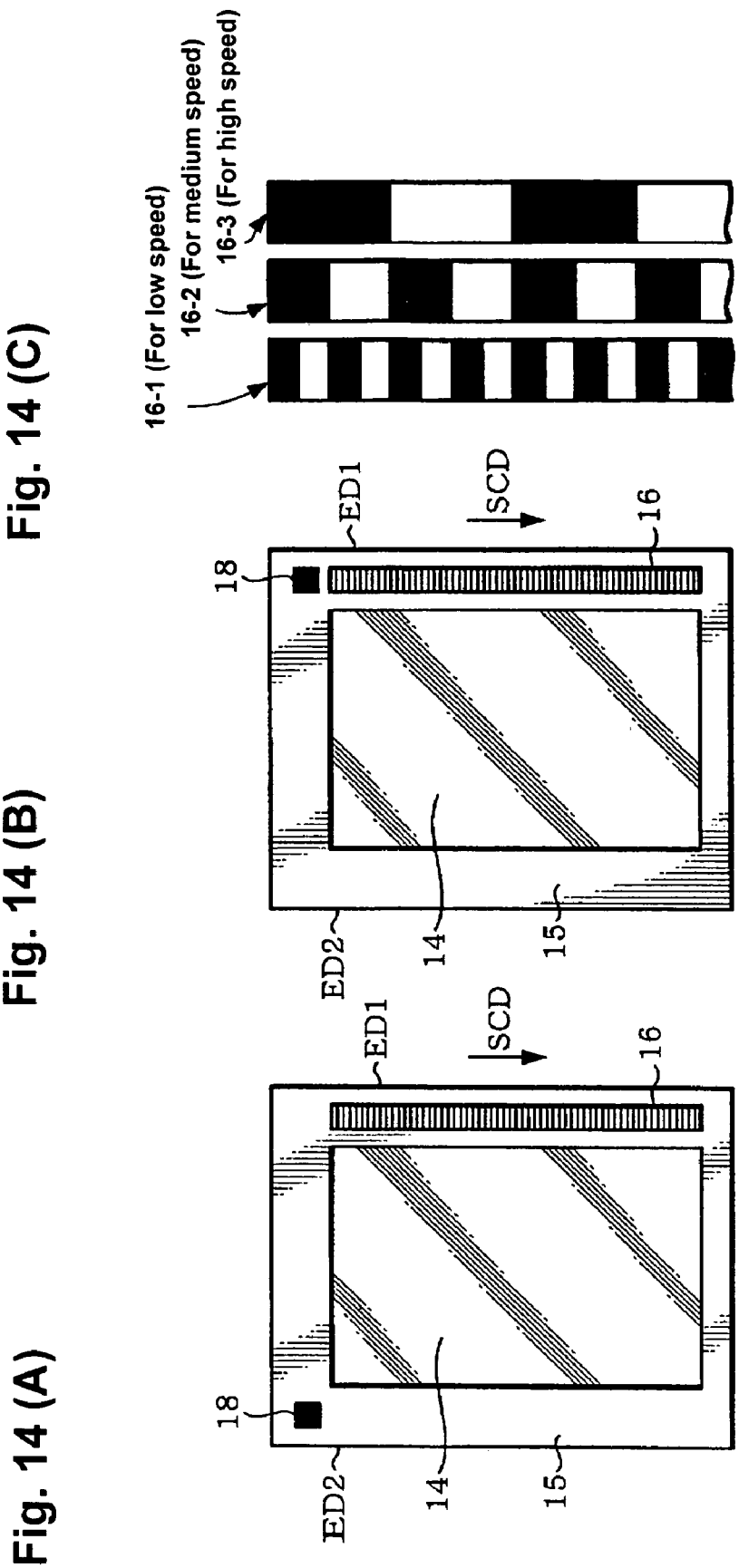
FIGS. 14(A)-(C) illustrates positions where certain printed information is disposed.

As indicated in FIG. 14(A), the printed matter 16 for speed control may be provided on a first side ED1 (a side along the auxiliary scanning direction SCD) of the underside surface of the frame 15. The printed matter 18 for initial position detection may provided on a second side ED2 (another side along the auxiliary scanning direction SCD) of that surface of the frame 15.

By disposing the servo-control-containing printed matter 16 and 18 in this manner, the servo speed control information in the printed matter 16 can be read using a first dummy pixel region ($D_{k+1}$-$D_1$ in FIG. 2(B)) on the right side of the image sensor 22, and the servo control information for initial position detection in the printed matter 18 can be read using a second dummy pixel region ($D_0$-$D_k$ in FIG. 2(B)) on the left side of the image sensor 22. Accordingly, the servo control information for speed control and for initial position detection can be obtained by different dummy pixel regions, such that the processing by the servo controller 80 can be simplified.

As indicated in FIG. 14(B), the printed matter 16 and 18 may be disposed on the same side (ED1 or ED2). Alternatively, the printed matter 16 and 18 may be disposed on the underside surface of the mounting base 14 instead of the corresponding surface of the frame 15. As a further alternative, only one of the printed matter 16 for speed control and the printed matter 18 for initial position detection may be attached.

As indicated in FIG. 14(C), a plurality of printed matter for speed control in different print patterns may be provided. This may be in the form of three printed patterns for example: a pattern 16-1 for low speed (first speed), a pattern 16-2 for medium speed (second speed), and a print pattern 16-3 for high speed (third speed). In this case, the printed patterns 16-1, 16-2 and 16-3 (e.g., barcodes) have mutually different bar intervals (intervals between black or white bars). More specifically, the printed pattern 16-1 for low speed has the narrowest bar interval, the printed pattern 16-2 for medium speed has the second narrowest bar interval, and the printed pattern 16-3 for high speed has the greatest bar interval.

By providing servo speed control information in this way, the servo controller 80 can perform servo control according to the corresponding speed control ranges. For example, when the carriage 20 is at a low speed (first speed), the servo control is performed based on the servo control information in print pattern 16-1; when the carriage 20 is at a medium speed (second speed), the servo control is performed based on the servo control information in print pattern 16-2; and when the carriage 20 is at a high speed (third speed), the servo control is performed based on the servo control information printed in print pattern 16-3.

Alternatively, servo control information on two of the print patterns 16-1, 16-2 and 16-3 may be used to perform the servo control in multiple ranges. For example, when the carriage is at a high speed, both the print pattern 16-3 for high speed and the print pattern 16-2 for medium speed may be used to perform the servo control.

Also, the number of print patterns for speed control may be 3, as indicated in FIG. 14(C), or may be 2, or 4 or more. The locations of the print patterns may be varied as well. For example, one print pattern for speed control (for example, 16-1) may be provided on the ED1 side of the frame 15 (or the mounting base 14), and another print pattern for speed control (for example, 16-2) may be provided on the ED2 side of the frame 15 (or the mounting base 14).

The printed matter 16 and 18 may be provided in the form of stickers that may be adhered to the rear or underside surface of either the frame 15 or the mounting base 14. Alternatively, the printed matter may be directly printed on the rear or underside surface of either the frame 15 or the mounting base 14 by an ink-jet method or the like. Or, members (for example, metal members) printed with appropriate patterns may be attached to the frame 15 or the mounting base 14.

Figure 15:
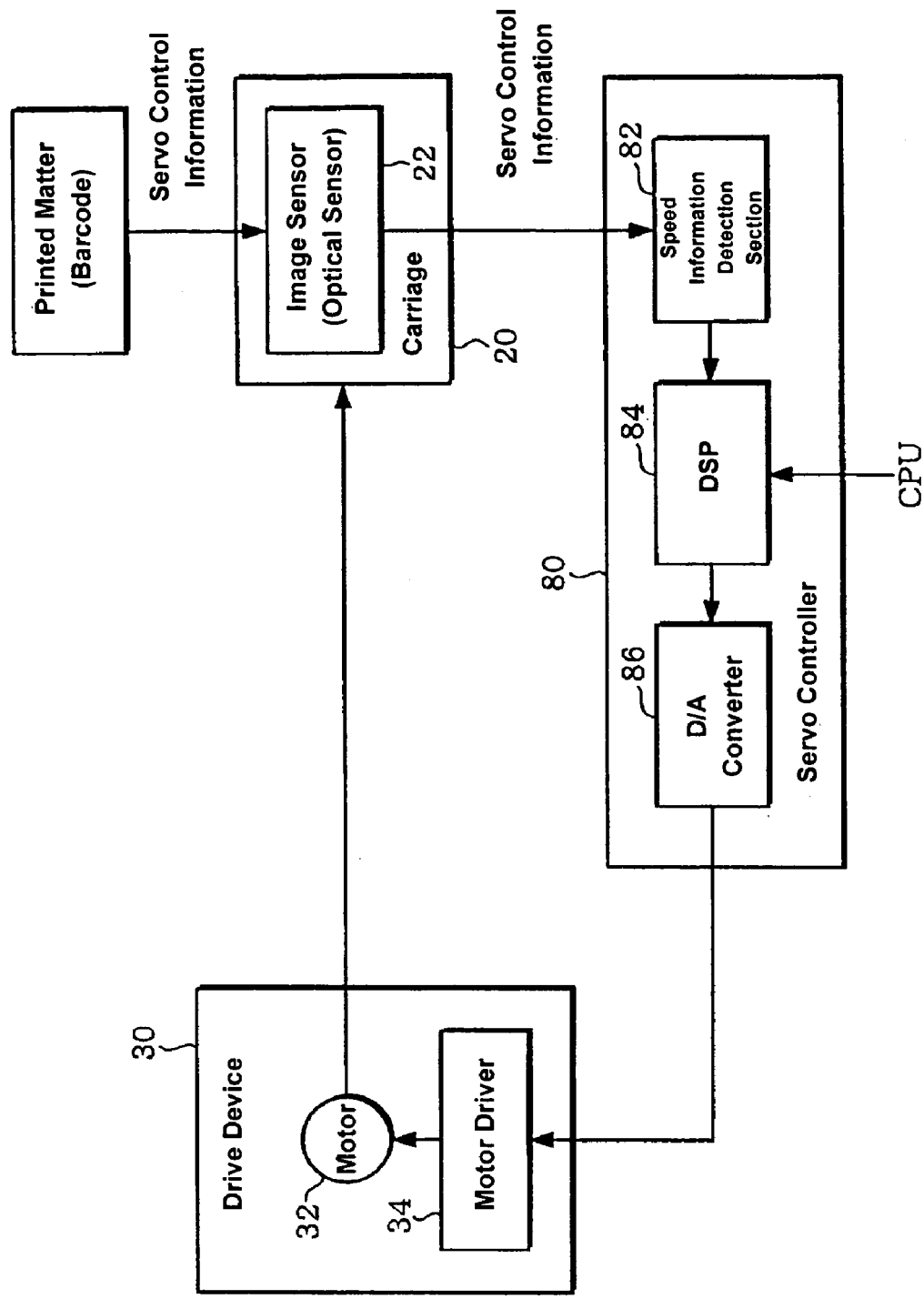
FIG. 15 is a block diagram illustrating an exemplary structure of a servo controller according to embodiments of the invention.

FIG. 15 shows an exemplary structure of the servo controller 80. It is noted that the servo controller 80 is not limited to the structure shown in FIG. 15; a portion of the components thereof may be omitted or other components may be added. In the illustrated embodiment, the servo controller 80 includes a speed information detection section 82 that detects speed information about the carriage 20 based on servo control information read by the image sensor 22. More specifically, a processing such as a binary-conversion of the servo control information provided from the image sensor 22 may be performed to thereby detect speed information.

The function of the speed information detection section 82 may be realized using a Digital Signal Processor (DSP) 84 in a succeeding stage that performs a variety of processing operations for servo control based on the speed information about the carriage 20, which is detected by the speed information detection section 82. In other words, feedback control of the speed of the carriage 20 (motor 32) is performed such that target speeds set in a speed table (speed profile) that may be set by the CPU or the like and the speeds of the carriage 20 become the same. More specifically, when the movement of the carriage 20 is started, an acceleration control for the carriage 20 is performed such that a target speed set in an acceleration period in the speed table and the speed of the carriage 20 become the same. Next, a speed control for the carriage 20 is performed such that a target speed set in a constant speed period in the speed table and the speed of the carriage 20 become the same to thereby set the speed of the carriage 20 at a constant speed. Then, when the carriage 20 approaches a target position, a deceleration control for the carriage 20 is performed such that a target speed set in a deceleration period in the speed table and the speed of the carriage 20 become the same to thereby decelerate the speed of the carriage. In this manner, the carriage 20 can be moved to and stopped at a desired position. Also, the DSP 84 may perform control to return the carriage 20 to the initial position (home position) based on the servo control information printed on the printed matter for initial position detection.

A D/A converter 86 converts digital drive signals from the DSP 84 to analog drive signals, and outputs the same to the motor driver 34. Then, the motor driver 34 drives the motor 32 to thereby perform speed control and position control of the carriage 20.

FIG. 16 shows an example of timing waveforms for operations of the servo controller 80. For example, at D1 the color of the printed matter (barcode) is detected as white, based on image data read by dummy pixels (dummy pixels $D_0$-$D_k$ in FIG. 2(B)) immediately after the shift signal SH becomes active. More specifically, the image data from the image sensor 22 is binarized, such that a binarized signal (speed information) becomes high (active) as indicated by D2. Also, at D3 in FIG. 16, the color of the printed matter is detected as black, based on image data read by the dummy pixels, and the binarized signal becomes low (non-active) as indicated by D4. Also, at D5 in FIG. 16, the color of the printed matter is detected as white based on image data read by the dummy pixels, and the binarized signal becomes high as indicated by D6. By obtaining the time interval TE between edges (rising edges or falling edges) of the binarized signal, the speed information for the carriage 20 can be detected.

While the invention has been described in conjunction with several specific embodiments, further alternatives, modifications, variations and applications will be apparent to those skilled in the art in light of the foregoing description. For example, the structure and composition of the various components disclosed, that is, the electronic device, electronic device controller, image sensor controller, servo controller, image sensor, and the like are not limited to those disclosed herein. In that regard, the servo control for the carriage may be realized by a method that uses a rotary encoder and a photo interrupter, instead of the method described above with reference to FIGS. 12-16. Also, the method for image reading processing is not limited to the method described herein. Also, in addition to being applicable to image scanners, facsimiles and copiers, the present invention is also applicable to other electronic devices and hybrid devices of the aforementioned devices. Accordingly, the invention herein is intended to embrace all such alternatives, modifications, variations and applications, as may fall within the spirit and scope of the appended claims.

What is claimed is:

1. An image sensor controller that controls an image sensor having a light receiving section and a transfer section that receives data signals from the light receiving section, the image sensor controller comprising:
   a drive controller configured to supply a shift/transfer clock to the transfer section, the shift/transfer clock used for shifting the data signals and transferring the data signals;
   the shift/transfer clock being configured to have a first frequency during a first period in which a first data signal of the data signals is outputted from a dummy pixel of a plurality of pixels included in the light receiving section, wherein the dummy pixel is light-shielded;
   the shift/transfer clock being configured to have a second frequency during a second period in which a second data signal of the data signals is outputted from a non-reading pixel of the plurality of pixels;
   the shift/transfer clock being configured to have a third frequency during a third period in which a third data signal of the data signals is outputted from a reading pixel of the plurality of pixels;
   the first frequency being higher than the second frequency; and
   the second frequency being higher than the third frequency.

2. An image sensor controller according to claim 1, wherein the drive controller includes a pattern selector configured to select, from among a plurality of clock patterns for setting the shift/transfer clock, a specific clock pattern for each period during which the data signals are outputted from the transfer section of the image sensor.

3. An image sensor controller according to claim 2, wherein:
   the drive controller includes a memory configured to store the plurality of clock patterns; and
   the pattern selector selects from among the plurality of clock patterns stored in the memory a specific clock pattern for each image data output period based on pattern switch timing setting information, and supplies the shift/transfer clock to the transfer section of the image sensor based on the clock pattern selected.

4. An image sensor controller according to claim 1, further comprising:
an image processing controller configured to (i) supply an A/D conversion/transfer clock to an A/D converter that converts analog data signals sent from the transfer section of the image sensor to digital data signals, and (ii) receives the digital data signals outputted from the A/D converter based on the supplied A/D conversion/transfer clock;
wherein the image processing controller invalidates data signals obtained from the dummy pixel and the non-reading pixel received from the A/D converter.

5. An image sensor controller according to claim 1, further comprising:
an image processing controller configured to (i) supply an A/D conversion/transfer clock to an A/D converter that converts analog data signals sent from the transfer section of the image sensor to digital data signals, and (ii) receives the digital data signals outputted from the A/D converter based on the supplied A/D conversion/transfer clock,
wherein the image processing controller disables an output operation of the A/D converter during periods in which the A/D converter outputs the data signals obtained from the dummy pixel and the non-reading pixel.

6. An image sensor controller according to claim 1, further comprising:
an image processing controller configured to (i) supply an A/D conversion/transfer clock to an A/D converter that converts analog data signals sent from the transfer section of the image sensor to digital data signals, and (ii) receives the digital data signals outputted from the A/D converter based on the supplied A/D conversion/transfer clock,
wherein the image processing controller supplies the A/D conversion/transfer clock at a constant clock frequency, irrespective of the changes in frequency of the shift/transfer clock.

7. An electronic device, comprising:
an image sensor that has a light receiving section and a transfer section that receives data signals from the light receiving section; and
an image sensor controller configured to control the image sensor, the image sensor controller comprising:
a drive controller configured to supply a shift/transfer clock to the transfer section the shift/transfer clock used for shifting the data signals and transferring the data signals;
the shift/transfer clock being configured to have a first frequency during a first period in which a first data signal of the data signals is outputted from a dummy pixel of a plurality of pixels included in the light receiving section, wherein the dummy pixel is light-shielded;
the shift/transfer clock being configured to have a second frequency during a second period in which a second data signal of the data signals is outputted from a non-reading pixel of the plurality of pixels;
the shift/transfer clock being configured to have a third frequency during a third period in which a third data signal of the data signals is outputted from a reading pixel of the plurality of pixels;
the first frequency being higher than the second frequency; and
the second frequency being higher than the third frequency.

8. An electronic device according to claim 7, further comprising:
a carriage on which the image sensor is mounted;
a drive device configured to drive the carriage in a scanning direction; and
a servo controller configured to perform servo control on the drive device in accordance with servo control information read by the image sensor from a source.

9. A method for controlling an image sensor having a light receiving section and a transfer section that receives data signals from the light receiving section, the method comprising:
controlling the frequency of a shift/transfer clock for shifting the data signals and transferring the data signals by:
setting the frequency of the shift/transfer clock to a first frequency in a dummy pixel output period during which a first data signal obtained from a dummy pixel region is outputted from the transfer section, wherein the dummy pixel is light-shielded;
setting the frequency of the shift/transfer clock to a second frequency in a non-reading pixel output period during which a second data signal obtained from a non-reading pixel region is outputted from the transfer section;
setting the frequency of the shift/transfer clock to a third frequency in a reading pixel output period during which a third data signal obtained from a reading pixel region is outputted from the transfer section;
the first frequency being higher than the second frequency; and
the second frequency being higher than the third frequency; and
supplying the shift/transfer clock to the transfer section which shifts and transfers received image data signals based on the frequency of the shift/transfer clock.

10. A method according to claim 9, further comprising selecting, from among a plurality of clock patterns for setting the shift/transfer clock, a specific clock pattern for each period during which the data signals are outputted from the transfer section of the image sensor.

11. An electronic device according to claim 7,
wherein the transfer section transfer the third data signal of the reading pixel region at a first transfer rate, and transfer the second data signal of the non-reading pixel region at a second transfer rate, which is faster than the first transfer rate, and transfer the first data signal of the dummy pixel region at a third transfer rate, which is faster than the second transfer rate.

12. An image sensor comprising:
a light receiving section; and
a transfer section that receives data signals from the light receiving section and transfer the image data signals,
wherein the transfer section transfer the data signals of a reading pixel region at a first transfer rate, and transfer the data signals of a non-reading pixel region at a second transfer rate, which is faster than the first transfer rate, and transfer the data signals of a dummy pixel region at a third transfer rate, which is faster than the second transfer rate, wherein the dummy pixel is light-shielded.

13. An image sensor controller that controls an image sensor having a light receiving section and a transfer section receiving data signals from the light receiving section, the image sensor controller comprising: a drive controller configured to supply a shift/transfer clock to the transfer section, the shift/transfer clock being used for shifting the data signals and transferring the data signals, the shift/transfer clock being configured to have a first frequency during a first period in which a first data signal of the data signals is outputted from a first pixel of a plurality of pixels included in the light receiving section, wherein the first pixel is light-shielded, the shift/transfer clock being configured to have a second frequency during a second period in which a second data signal of the data signals is outputted from a second pixel of the plurality of pixels, and the shift/transfer clock being configured to have a third frequency during a third period in which a third data signal of the data signals is outputted from a third pixel of the plurality of pixels, the first data signal being outputted before the second data signal, the second data signal being outputted before the third data signal, the first frequency being higher than the second frequency, the second frequency being higher than the third frequency, the first pixel being a dummy pixel, the second pixel being a non-reading pixel, and the third pixel being a reading pixel.

14. An image sensor controller that controls an image sensor having a light receiving section and a transfer section receiving data signals from the light receiving section, the image sensor controller comprising: a drive controller configured to supply a shift/transfer clock to the transfer section, the shift/transfer clock being used for shifting the data signals and transferring the data signals; the shift/transfer clock being configured to have a first frequency during a first period in which a first data signal of the data signals is outputted from a first pixel of a plurality of pixels that are arranged in one line of the light receiving section, wherein the first pixel is light-shielded; the shift/transfer clock being configured to have a second frequency during a second period in which a second data signal of the data signals is outputted from a second pixel of the plurality of pixels; the shift/transfer clock being configured to have a third frequency during a third period in which a third data signal of the data signals is outputted from a third pixel of the plurality of pixels; the first data signal being outputted before the second data signal; the second data signal being outputted before the third data signal; the first frequency being higher than the second frequency the second frequency being higher than the third frequency, the first pixel being a dummy pixel; the second pixel being a non-reading pixel; and the third pixel being a reading pixel.

15. An image sensor controller that controls an image sensor, the image sensor controller comprising: a drive controller configured to supply a transfer clock and a shift signal to the image sensor, the transfer clock being used for transferring the data signals; the transfer clock being configured to have a first frequency during a first period in which a first data signal of the data signals outputted from a first pixel of a plurality of pixels included in the light receiving section is transferred, wherein the first pixel is light-shielded; the transfer clock being configured to have a second frequency during a second period in which a second data signal of the data signals outputted from a second pixel of the plurality of pixels is transferred; the transfer clock being configured to have a third frequency during a third period in which a third data signal of the data signals outputted from a third pixel of the plurality of pixels is transferred; the first frequency being higher than the second frequency; the second frequency being higher than the third frequency; the first data signal being transferred before the second data signal; the second data signal being transferred before the third data signal, the first pixel being a dummy pixel; the second pixel being a non-reading pixel; and the third pixel being a reading pixel; the first data signal, the second data signal, and the third data signal being transferred during at least a part of a fourth period between a first pulse of a shift signal to a second pulse next to the first pulse of the shift signal.

16. An image sensor controller that controls an image sensor, the image sensor controller comprising: a drive controller configured to supply a transfer clock and a shift signal to the image sensor, the transfer clock being used for transferring the data signals; the transfer clock being configured to have a first frequency during a first period in which a first data signal of the data signals outputted from a first pixel of a plurality of pixels included in the light receiving section is transferred, wherein the first pixel is light-shielded; the transfer clock being configured to have a second frequency during a second period in which a second data signal of the data signals outputted from a second pixel of the plurality of pixels is transferred; the transfer clock being configured to have a third frequency during a third period in which a third data signal of the data signals outputted from a third pixel of the plurality of pixels is transferred; the first frequency being higher than the second frequency; the second frequency being higher than the third frequency; the first data signal being transferred before the second data signal; the second data signal being transferred before the third data signal, the first pixel being a dummy pixel; the second pixel being a non-reading pixel; and the third pixel being a reading pixel; the first data signal, the second data signal, and the third data signal being transferred during at least a part of a fourth period between a first timing that a shift signal changes from a first level to a second level and a second timing that a shift signal changes from the first level to the second level next to the first timing.

* * * * *